US011519511B1

(12) United States Patent
Keller et al.

(10) Patent No.: US 11,519,511 B1
(45) Date of Patent: Dec. 6, 2022

(54) FLUIDIC DEVICES AND RELATED METHODS AND WEARABLE DEVICES

(71) Applicant: META PLATFORMS TECHNOLOGIES, LLC, Menlo Park, CA (US)

(72) Inventors: Sean Jason Keller, Bellevue, WA (US); David R. Perek, Seattle, WA (US); Tristan Thomas Trutna, Seattle, WA (US); Garett Andrew Ochs, Seattle, WA (US); Nicholas Roy Corson, Woodinville, WA (US); Raymond King, Woodinville, WA (US); Jack Lindsay, Seattle, WA (US); Riccardo DeSalvo, Pasadena, CA (US); Joseph Minh Tien, Alhambra, CA (US); Matthew Robert Schwab, Pasadena, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/531,503

(22) Filed: Nov. 19, 2021

Related U.S. Application Data

(63) Continuation of application No. 16/688,575, filed on Nov. 19, 2019, now Pat. No. 11,204,100, which is a
(Continued)

(51) Int. Cl.
*F16K 7/07* (2006.01)
*F16K 31/126* (2006.01)
(Continued)

(52) U.S. Cl.
CPC ............ *F16K 7/075* (2013.01); *F16K 31/126* (2013.01); *F15C 3/04* (2013.01); *F16K 99/0015* (2013.01); *F16K 99/0061* (2013.01); *G05D 7/03* (2013.01)

(58) Field of Classification Search
CPC .... F16K 7/075; F16K 31/126; F16K 99/0015; F16K 99/0061; G05D 7/03; F15C 3/04
(Continued)

(56) References Cited

U.S. PATENT DOCUMENTS

| 844,410 A | 2/1907 | Schauer |
| 1,772,210 A * | 8/1930 | Dale ........................ E21B 33/08 |
| | | 251/5 |

(Continued)

FOREIGN PATENT DOCUMENTS

| EP | 3351839 A2 | 7/2018 |
| KR | 20160098056 A | 8/2016 |

(Continued)

OTHER PUBLICATIONS

Devaraju N.S.G.K., et al., "Pressure Driven Digital Logic in PDMS Based Microfluidic Devices Fabricated by Multilayer Soft Lithography," Lab Chip, The Royal Society of Chemistry, 2012, vol. 12, pp. 4809-4815.

(Continued)

*Primary Examiner* — Umashankar Venkatesan
(74) *Attorney, Agent, or Firm* — FisherBroyles, LLP

(57) ABSTRACT

A fluidic device comprises a channel, a gate, and one or more additional elements. The channel is configured to transport a fluid from a source to a drain. The gate includes a chamber with an adjustable volume that affects fluid flow within the channel by displacing a wall of the channel toward an opposite wall of the channel based in part on fluid pressure within the chamber exceeding a threshold pressure. A high pressure state of the gate corresponds to a first chamber size and a first flow rate of the fluid. A low pressure state of the gate corresponds to a second chamber size that is smaller than the first chamber size and a second flow rate that is greater than the first flow rate. The additional ele-
(Continued)

ments are configured to reduce the threshold pressure past which the chamber decreases the cross-sectional area of the channel.

17 Claims, 9 Drawing Sheets

Related U.S. Application Data continuation of application No. 15/706,578, filed on Sep. 15, 2017, now Pat. No. 10,502,327.

(60) Provisional application No. 62/399,153, filed on Sep. 23, 2016.

(51) Int. Cl.
*F16K 99/00* (2006.01)
*F15C 3/04* (2006.01)
*G05D 7/03* (2006.01)

(58) Field of Classification Search
USPC .......................................................... 251/5
See application file for complete search history.

(56) References Cited

U.S. PATENT DOCUMENTS

| | | | |
|---|---|---|---|
| 2,241,086 A | 5/1941 | Gould | |
| 2,345,693 A | 4/1944 | Wilson et al. | |
| 2,590,215 A | 3/1952 | Sausa | |
| 2,715,009 A | 8/1955 | Beekley | |
| 3,468,342 A * | 9/1969 | Craft | F15C 1/04 |
| | | | 251/5 |
| 3,549,118 A | 12/1970 | Bluder et al. | |
| 3,936,028 A | 2/1976 | Norton et al. | |
| 3,951,168 A | 4/1976 | Roberts | |
| 4,642,833 A * | 2/1987 | Stoltz | E04H 4/1663 |
| | | | 137/853 |
| 5,065,978 A * | 11/1991 | Albarda | F04B 43/046 |
| | | | 257/419 |
| 5,078,363 A | 1/1992 | Gregory | |
| 5,325,880 A * | 7/1994 | Johnson | F16K 99/0038 |
| | | | 60/528 |
| 5,441,231 A | 8/1995 | Payne et al. | |
| 6,131,879 A * | 10/2000 | Kluge | F16K 99/0009 |
| | | | 137/831 |
| 6,406,605 B1 | 6/2002 | Moles | |
| 6,474,623 B1 | 11/2002 | Davies | |
| 7,090,471 B2 * | 8/2006 | Xie | F04B 43/12 |
| | | | 417/413.3 |
| 7,703,477 B2 | 4/2010 | Cook et al. | |
| 8,603,834 B2 | 12/2013 | Puleo et al. | |
| 8,922,355 B2 * | 12/2014 | Kusuura | G06F 3/014 |
| | | | 340/407.1 |
| 11,193,479 B2 * | 12/2021 | Mou | F16K 99/0001 |
| 2003/0010946 A1 | 1/2003 | Furukawa et al. | |
| 2003/0141470 A1 | 7/2003 | Igarashi | |
| 2003/0196695 A1 | 10/2003 | O'Connor et al. | |
| 2004/0033108 A1 | 2/2004 | Raftis et al. | |
| 2004/0056220 A1 | 3/2004 | Raftis | |
| 2006/0058740 A1 | 3/2006 | Cise et al. | |
| 2006/0243934 A1 | 11/2006 | Chung et al. | |
| 2007/0170382 A1 | 7/2007 | Li et al. | |
| 2008/0087853 A1 | 4/2008 | Kees | |
| 2008/0264863 A1 | 10/2008 | Quake et al. | |
| 2009/0007969 A1 | 1/2009 | Gundel | |
| 2009/0145502 A1 | 6/2009 | Dirac et al. | |
| 2009/0302244 A1 * | 12/2009 | Wedel | F16K 7/07 |
| | | | 251/5 |
| 2010/0078584 A1 * | 4/2010 | Van Den Bijgaart | F16K 99/0015 |
| | | | 251/331 |
| 2010/0093559 A1 | 4/2010 | Fan et al. | |
| 2010/0170572 A1 | 7/2010 | Sahoo et al. | |
| 2010/0180970 A1 | 7/2010 | Welle | |
| 2010/0260617 A1 | 10/2010 | Haertl | |
| 2010/0266980 A1 | 10/2010 | Boyd et al. | |
| 2011/0045599 A1 | 2/2011 | Erickson et al. | |
| 2012/0039770 A1 | 2/2012 | Namkoong et al. | |
| 2012/0275929 A1 * | 11/2012 | Salsman | F16K 99/0026 |
| | | | 417/322 |
| 2013/0255815 A1 * | 10/2013 | Brinkmann | F15D 1/025 |
| | | | 137/831 |
| 2014/0130920 A1 | 5/2014 | Fernandes et al. | |
| 2014/0134001 A1 | 5/2014 | Uchida et al. | |
| 2015/0267822 A1 | 9/2015 | Nissen | |
| 2016/0363997 A1 * | 12/2016 | Black | G06F 3/014 |
| 2017/0300115 A1 * | 10/2017 | Kerr | G06F 3/016 |
| 2018/0038513 A1 | 2/2018 | Baldea et al. | |

FOREIGN PATENT DOCUMENTS

| | | |
|---|---|---|
| WO | 8905417 A1 | 6/1989 |
| WO | 2010104878 A1 | 9/2010 |
| WO | 2016205143 A1 | 12/2016 |

OTHER PUBLICATIONS

Eddington D.T., et al., "Flow Control With Hydrogels," Science Direct, Advanced Drug Delivery Reviews, Feb. 10, 2004, vol. 56 (2), pp. 199-210.
Frank P., et al., "Integrated Microfluidic Membrane Transistor Utilizing Chemical Information for On-Chip Flow Control," PLOS One, Aug. 29, 2016, vol. 11 (8), pp. 1-17.
International Search Report and Written Opinion for International Application No. PCT/US2017/052048, dated May 23, 2018, 16 Pages.
International Search Report and Written Opinion for International Application No. PCT/US2017/064683, dated Mar. 30, 2018, 17 Pages.
International Search Report and Written Opinion for International Application No. PCT/US2018/046486, dated Jan. 8, 2019, 13 Pages.
Mohan R., et al., "Design Considerations for Elastomeric Normally Closed Microfluidic Valves," Sensors and Actuators B: Chemical, International Journal Devoted to Research and Development of Physical and Chemical Transducers, Dec. 15, 2011, vol. 160 (1), pp. 1216-1223.
Non-Final Office Action dated Feb. 25, 2019 for U.S. Appl. No. 15/706,578, filed Sep. 15, 2017, 19 pages.
Notice of Allowance dated Aug. 7, 2019 for U.S. Appl. No. 15/706,578, filed Sep. 15, 2017, 14 Pages.
Partial European Search Report for European Application No. 18151564.4, dated Jul. 17, 2018, 15 Pages.
Partial European Search Report for European Application No. 18158349.3, dated Sep. 20, 2018, 15 Pages.
Perdigones F., et al., "Correspondence Between Electronics and Fluids in MEMS: Designing Microfluidic Systems Using Electronics," IEEE Industrial Electronics Magazine, vol. 8 (4), Dec. 12, 2014, pp. 6-17.
Yu Q., et al., "Responsive Biomimetic Hydrogel Valve for Microfluidics," Applied Physics Letters, Apr. 23, 2001, vol. 78 (17), pp. 2589-2591.

* cited by examiner

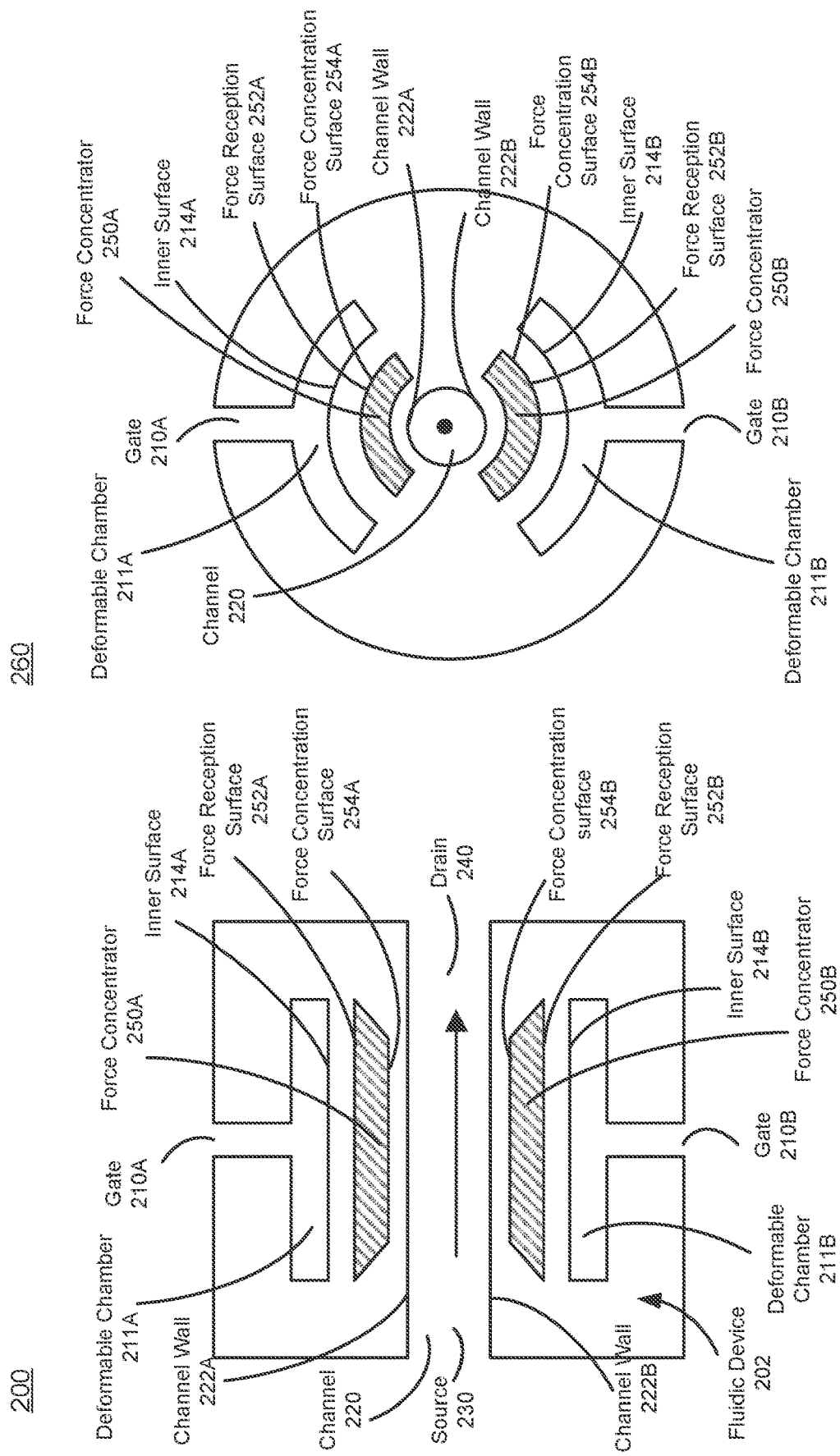

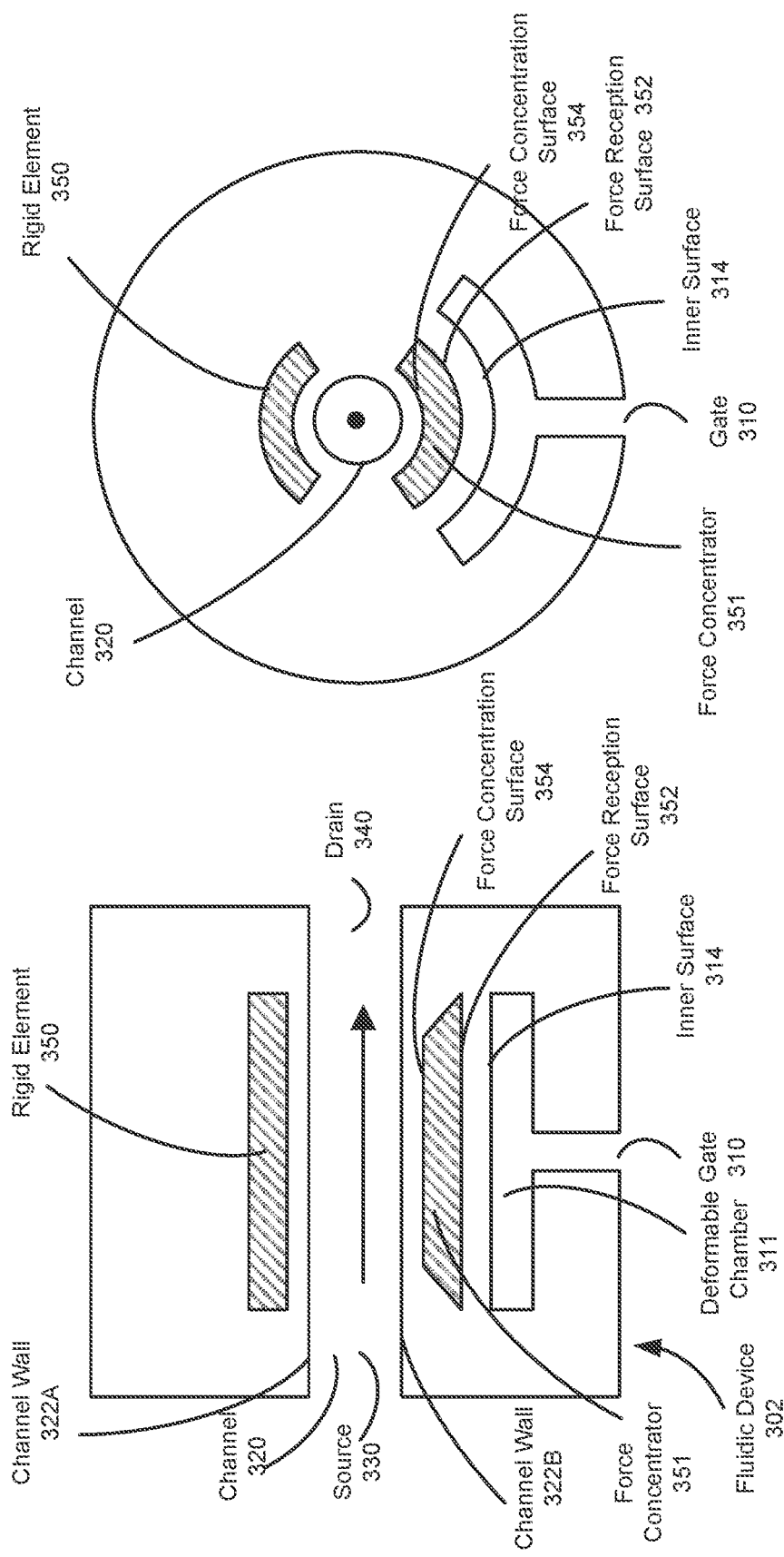

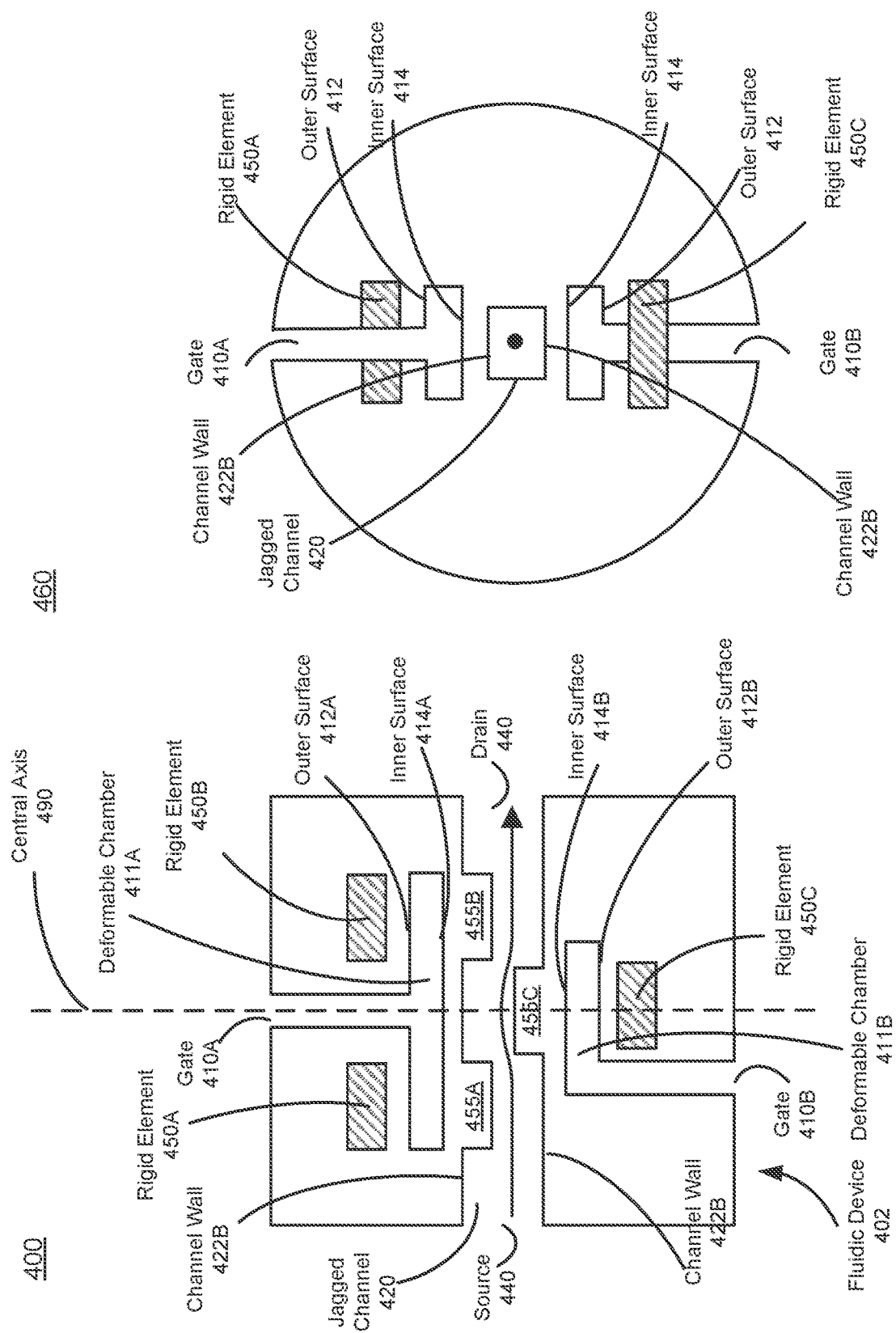

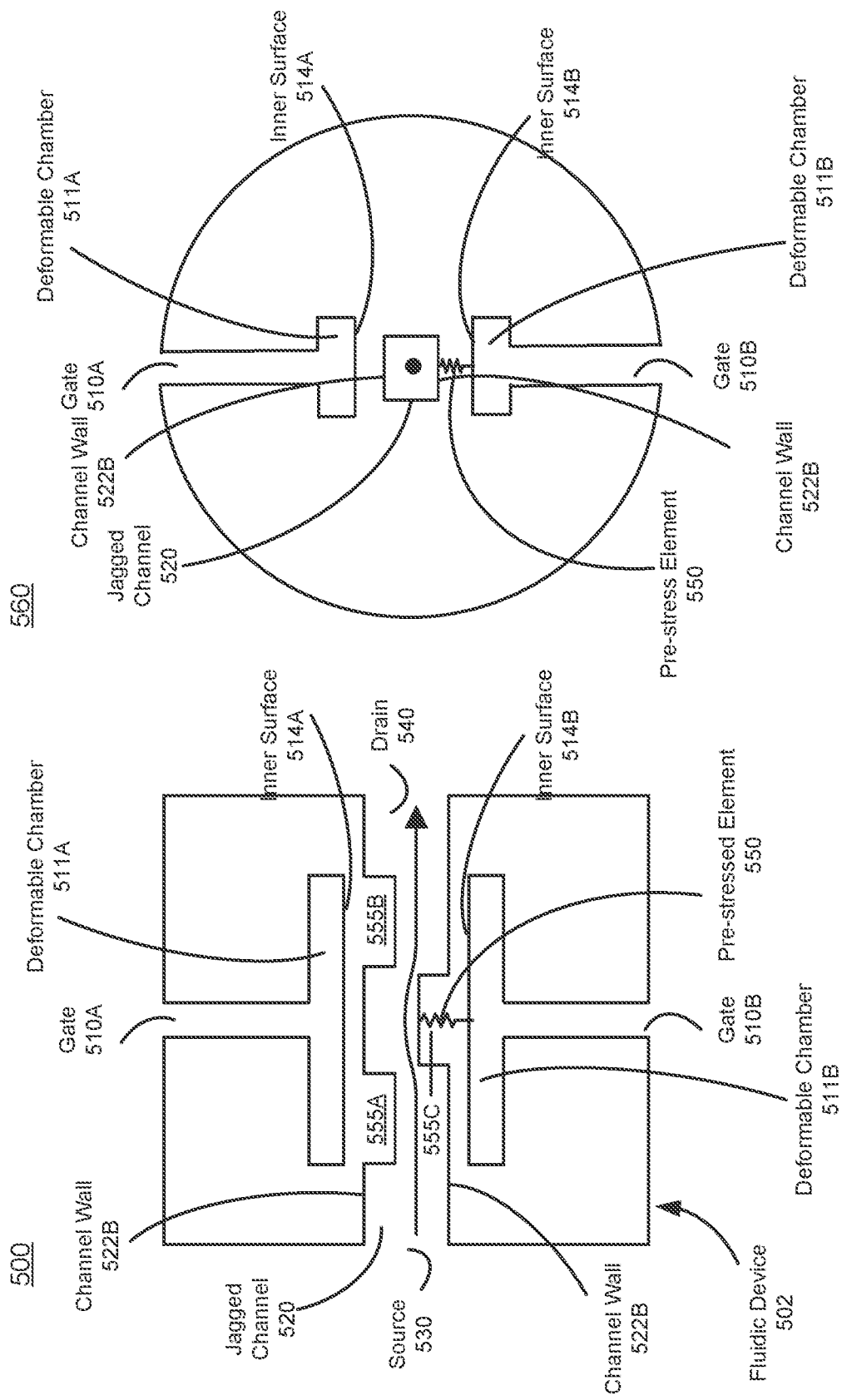

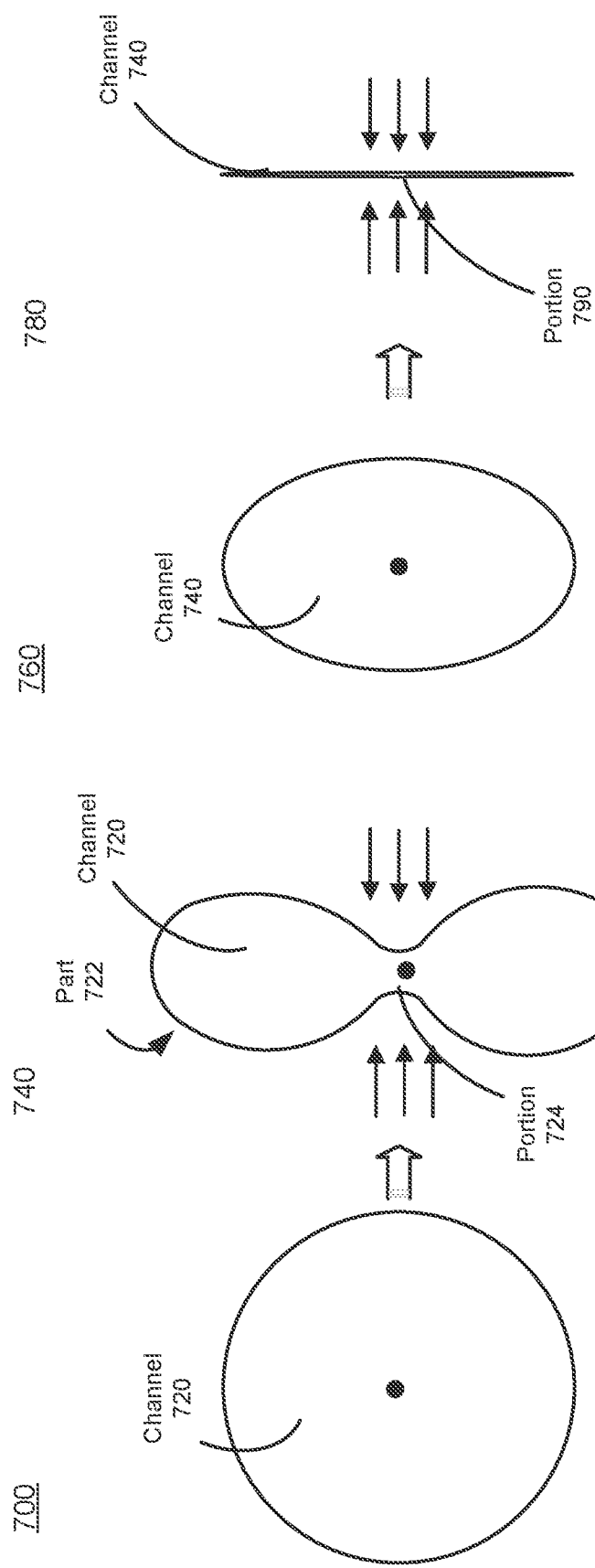

FLUIDIC DEVICES AND RELATED METHODS AND WEARABLE DEVICES

CROSS REFERENCE TO RELATED APPLICATIONS

This application is a continuation of U.S. application Ser. No. 16/688,575, filed Nov. 19, 2019, which is continuation of U.S. application Ser. No. 15/706,578, filed Sep. 15, 2017, which claims the benefit of U.S. Provisional Application No. 62/399,153, filed Sep. 23, 2016, the disclosures of each of which are incorporated, in their entirety, by this reference.

BACKGROUND

The present disclosure generally relates to fluidic devices for head-mounted displays (HMD) and more specifically to using fluidic devices in virtual reality systems.

Virtual reality (VR) is a simulated environment created by computer technology and presented to a user, such as through a VR system. In some VR systems wearable devices (e.g., glove) allow a user to interact with virtual objects. Circuitry on such wearable devices can be complex, bulky, and in some cases heavy. As a result, conventional wearable devices can detract from a user's experience with a VR system.

SUMMARY

Embodiments of the disclosed invention include fluidic devices used in VR, augmented reality (AR) systems, and/or mixed reality (MR) systems. Fluidic devices are fluid handling devices that function analogous to electronic devices (e.g., an electrical field effect transistor, an electrical diode, a resistor, a capacitor, etc.). For example, a fluidic device may be designed such that it operates as a fluidic transistor. Additionally, fluidic devices are composable, meaning that fluidic devices may be coupled together to form a composite fluidic device (e.g., a decoder). In some embodiments, groups of fluidic devices are coupled together to act as controllers for a haptic apparatuses on wearable devices (e.g., haptic gloves) for a VR system.

A fluidic device generally includes a channel that includes an input (e.g., a source) and an output (e.g., a drain). The channel directs a fluid (e.g., liquid or gas) from the input to the output. The fluidic device also includes a gate that affects the flow of fluid in the channel. For example, in some embodiments, once a threshold gate pressure is achieved (i.e., a high pressure state), the gate may restrict the fluid flow in the channel. In alternate embodiments, the flow in the channel is restricted until a threshold pressure (i.e., the high pressure state) in the gate is achieved.

In one embodiment, a wearable device is implemented in a system for providing VR, AR, MR, or some combination thereof, experience to a user who wears the device. In more detail, the wearable device provides haptic feedback to the user in response to instructions from a console of the system. The wearable device includes at least one actuator, and a controller. The controller is composed of a plurality of fluidic devices. In some embodiments, the fluidic devices are coupled together to form one or more composite fluidic devices. For example, a composite device may be a decoder that is used to address the at least one actuator.

In one embodiment, a fluidic device comprises a channel, a gate, and one or more additional elements. The channel is configured to transport a fluid from a source to a drain. The source is an input that fluid enters the channel and the drain is an output for fluid in the channel. The gate includes a chamber with an adjustable volume that affects fluid flow within the channel by displacing a first wall of the channel toward a second wall of the channel that is opposite the first wall. The displacement is based on fluid pressure within the chamber exceeding a threshold pressure. A low pressure state of the gate corresponds to a first chamber size and a first flow rate. A high pressure state of the gate corresponds to a second chamber size that is larger than the first chamber size and a second flow rate of the fluid that is smaller than the first flow rate. The additional elements are configured to reduce the threshold pressure past which the chamber decreases the cross-sectional area of the channel. In certain embodiments, the fluidic device may be included in a haptic device.

BRIEF DESCRIPTION OF THE FIGURES

FIG. 2A is a first cross section of an example symmetric co-casted fluidic device including force concentrators, in accordance with an embodiment.

FIG. 2B is a second cross section orthogonal to the first cross section of the symmetric co-casted fluidic device shown in FIG. 2A, in accordance with an embodiment.

FIG. 3A is a first cross section of an example asymmetric co-casted fluidic device including a force concentrator, in accordance with an embodiment.

FIG. 3B is a second cross section orthogonal to the first cross section of the asymmetric co-casted fluidic device shown in FIG. 3A, in accordance with an embodiment.

FIG. 4A is a first cross section of an example asymmetric fluidic device including a jagged channel, in accordance with an embodiment.

FIG. 4B is a second cross section orthogonal to the first cross section of the asymmetric fluidic device shown in FIG. 4A, in accordance with an embodiment.

FIG. 5A is a first cross section of an example asymmetric fluidic device including a pre-stressed element, in accordance with an embodiment.

FIG. 5B is a second cross section orthogonal to the first cross section of the asymmetric fluidic device shown in FIG. 5A, in accordance with an embodiment.

FIG. 7A shows deformation of a circular cross section of a channel of an example fluidic device before and after pressure is applied to the channel, in accordance with an embodiment.

FIG. 7B shows deformation of a lemon-shaped cross section of the channel shown in FIG. 7A before and after pressure is applied to the channel, in accordance with an embodiment.

Figures 1A, 1B:
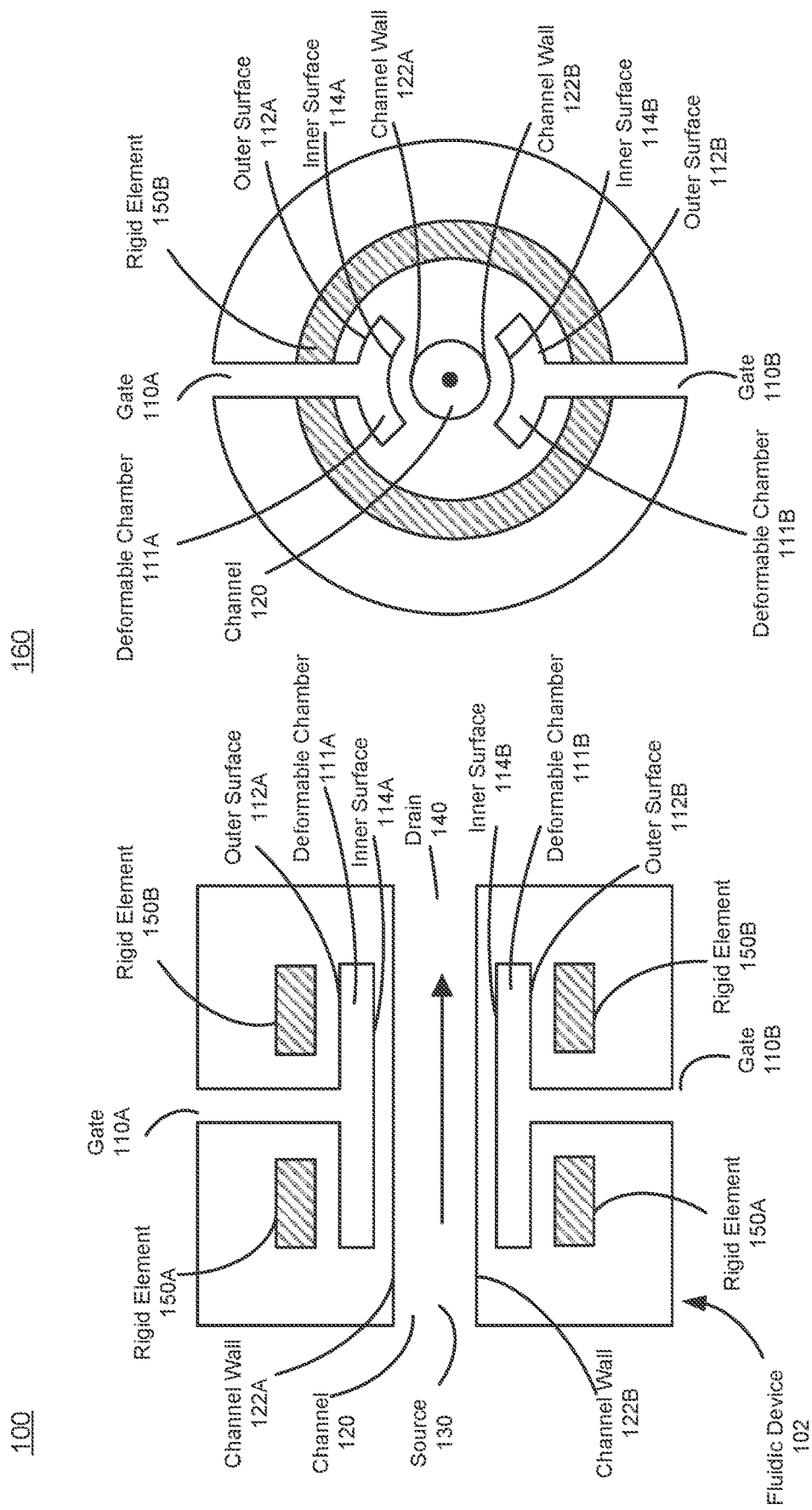
FIG. 1A is a first cross section of an example symmetric co-casted fluidic device including rigid elements, in accordance with an embodiment.
FIG. 1B is a second cross section orthogonal to the first cross section of the symmetric co-casted fluidic device shown in FIG. 1A, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Embodiments of the disclosed invention include fluidic devices used in Virtual Reality (VR), augmented reality (AR) systems, and/or mixed reality (MR) systems. In further embodiments, the disclosed invention includes fluidic devices used in prosthesis and other medical devices. In some embodiments, fluidic devices are devices made of soft materials that user millimeter or smaller channels filled with fluid to transmit information or control pressure, and the fluidic devices may be used to implement logic and have control actuators for transmitting information. In one embodiment, the fluidic devices are fluid handling devices that function analogous to electronic devices (e.g., an electrical field effect transistor, an electrical diode, etc.) in electrical systems. For example, a fluidic device may be designed such that it operates as a fluidic transistor. Additionally, fluidic devices are composable, meaning that fluidic devices may be coupled together to form a composite fluidic device (e.g., a decoder). In some embodiments, groups of fluidic devices are coupled together to act as controllers for a haptic apparatuses on wearable devices (e.g., haptic gloves) for a VR system.

A fluidic device generally includes a channel that includes an input (e.g., a source) and an output (e.g., a drain). In one embodiment, the input and output are part of the same channel, and in another embodiment, the input and output are located separately in different fluidic devices. The channel directs a fluid (e.g., liquid or gas) from the input to the output. The fluidic device may also include a gate that affects the flow of fluid in the channel. For example, in some embodiments, once a threshold gate pressure is achieved (i.e., a high pressure state) the gate may restrict the fluid flow in the channel. In alternate embodiments, the flow in the channel is restricted until a threshold pressure (i.e., the high pressure state) in the gate is achieved.

The components (e.g., gate) of fluidic devices are generally composed of one or more base materials such as silicone, a type of elastomer, and plastic, etc. In some embodiments, in addition to the base materials, other materials are co-casted with these base materials to form co-casted fluidic devices. Manufacture of co-casted fluidic devices may be accomplished by means of manufacturing other than co-casting. For example, co-casted fluidic devices may be manufacturing using techniques such as lithography and printed circuit production. Co-casted fluidic devices facilitate integration of additional elements such as rigid elements, force concentrators, etc., into the structured of a fluidic device. In one embodiment, the co-casted fluidic devices help reduce gate pressure (e.g., minimize the gate pressure) required to affect the pressure of flow inside the channel. For example, additional elements are added above, underneath or around the channel to reduce the amount of gate pressure needed to open or close the channel of a fluidic device, in which case the channel and other parts of the fluidic device can deform easier than they would otherwise, as more fully described below in FIGS. 1A-7B. The other materials that are used to form the additional elements can be any stiffening materials such as rigid fabric, semi-rigid fabric, solid fabric, inclusion rigid elements, and other materials. Example materials include woven polyurethane or nylon mesh (woven meshes and fabrics have a non-linear stiffness allowing for some expansion before "locking"), non-woven polyethylene non-woven materials that are highly inextensible while maintaining very low bending stiffness. (e.g., TYVEK®), solid plastics (e.g., polyimide) —and these example materials provide high stiffness in elongation/tension. Other example materials include rigid plastics, e.g., UV-curable resin, elastomers with a higher stiffness than the base material, e.g., a 40 durometer shore, and an elastomer might be placed in a part made from a 20 durometer shore A elastomer.

The co-casted fluidic devices can have different geometric compositions, for example, symmetrical or asymmetrical. As one example, a co-casted fluidic device can be symmetrical with the same elements integrated outside and around channel. As another example, a co-casted fluidic device can be asymmetrical with different elements integrated outside and around the channel. Detailed examples about symmetrical and asymmetrical co-casted fluidic devices are described below with reference to FIGS. 1A-6B.

In one embodiment, a wearable device is implemented in a system for providing VR, AR, MR, or some combination thereof, experience to a user who wears the device. In more detail, the wearable device provides haptic feedback to the user in response to instructions from a console of the system. The wearable device includes at least one actuator, and a controller. The controller is composed of a plurality of fluidic devices as described above. In some embodiments, the fluidic devices are coupled together to form one or more composite fluidic devices.

A flow rate indicates a speed of the fluid flowing from one end (e.g., a source) to the other end (e.g., a drain) in a channel of a fluidic device. An example volumetric flow rate is 60 ml/min. The flow rate in a channel of a fluidic device may be affected by, e.g., a pressure of a gate, a pressure of a source, and a pressure of a drain.

An "open" state of a channel refers to a state when the fluid in the channel is flowing from one end (e.g., the source) to the other end (e.g., the drain) at some open threshold flow rate. In contrast, a "closed" state of the channel refers to the state when the flow of fluid in the channel is less than some closed threshold flow rate, preventing the flow in the channel to flow from one end to the other end. In addition, a "transitionary" state occurs when the channel transitions from an open state to a closed state or from a closed state to an open state.

A "high pressure," a "transitionary" pressure, and a "low pressure" described here depend on the fluidic device structures and pressure of the fluid filling the fluidic device. In general, a "low pressure" is a pressure of the fluid that falls within a low pressure range, a "high pressure" is a pressure of the fluid that falls within a high pressure range, and a "transitionary" pressure is a pressure of the fluid that falls between the low pressure range and the high pressure range. Note, in some embodiments there is a high pressure range and a low pressure range, but not a transitionary range. Moreover, different components of a fluidic device may have different high pressure ranges, different transitionary pressure ranges, and different low pressure ranges. For example, a high pressure range of a gate may be significantly less than a high pressure range of a source.

Turning, now to a discussion of symmetric fluidic devices, FIG. 1A is a first cross section 100 of an example symmetric co-casted fluidic device 102 including rigid elements 150A, 150B, in accordance with an embodiment. The fluidic device 102 includes a gate 110A, a gate 110B, a channel 120 that connects a source 130 and a drain 140, and multiple rigid elements 150A, 150B. The fluidic device 102 shown in FIG. 1A is merely one example, and in alternative embodiments not shown, the fluidic device 102 may include additional/fewer or different components.

The channel 120 is a part of the fluidic device 102 that is filled with fluid (e.g., liquid or gas) flowing from the source 130 to the drain 140 while the channel is in an "open" state. The pressure of the fluid at the source 130 is typically higher than the pressure of the fluid at the drain 140, which allows the fluid to flow from the source 130 to the drain 140. In FIG. 1A-1B, the shape of the cross section of the channel 120 is a circle, as more clearly shown in FIG. 1B. In alternative embodiments not shown, the cross section of the channel 120 may be rectangular, or some other shape e.g., a lemon-shaped channel.

The gates 110A, 110B are symmetric relative to the channel 120. The gates 110A, 110B include deformable chambers 111A, 111B, respectively. The deformable chambers 111A, 111B deform with changes in fluid pressure applied at the gates 110A, 110B. The deformable chamber 111A includes an outer surface 112A and an inner surface 114A, likewise, the deformable chamber 111B includes an outer surface 112B and an inner surface 114B. In this embodiment the inner surfaces 114A, 114B of the deformable chambers 111A, 111B refer to surfaces of the gates 110A, 110B that are parallel to and close to channel walls 122A, 122B of the channel 120. The outer surfaces 112A, 112B described herein refer to surfaces of the gates 110A, 110B that are parallel with the channel 120 but closer to the rigid elements 150A, 150B.

The gates 110A, 110B are filled with a fluid (e.g., liquid or gas) that comes from an external fluid supply that is not shown (e.g., another fluidic device, a fluid pressure rail, some other fluid supply, etc.). In alternative embodiments not shown, the deformable chambers 111A, 111B can have different shapes and configurations or are positioned in a different place inside the fluidic device 100. As one example, as discussed in detail below, once fluid pressure increases within the deformable chamber 111A past a threshold pressure, the inner surface 114A deforms towards the channel 120, causing the channel wall 122A to move towards the opposite channel wall 122B. For example, if the fluid pressure is within a low pressure range, then minimal deformation of the inner surface 114A toward the channel 120 occurs. As fluid pressure in the gate 110A increases and it moves into a transitionary range, and the inner surface 114A expands causing the channel wall 122A to move towards the channel wall 122B, and therefore reduces a size of the cross section of the channel 120 (i.e., reduces flow rate within the channel 120). The gate 110B is functionally similar to the gate 110A, such that while fluid pressure within the gate 110B is within a low pressure range, then minimal deformation of the inner surface 114B toward the channel 120 occurs. And that while the fluid pressure within the gate 110B is within a transitionary pressure range, the inner surface 114B expands causing the channel wall 122B to move towards the channel wall 122A. Once the fluid pressure in the gate 110A and the gate 110B move into a high pressure range, the expansion of the inner surfaces 114A and 114B are such that the channel walls 122A and 122B have restricted the flow to a flow rate that puts the fluidic device 102 in a "closed" state. In some embodiments, the "closed" state may be zero flow (i.e., channel walls 122A and 122B are in contact and preventing flow from the source 130 to the drain 140). In this manner, fluid pressure applied to the gates 110A, 110B can reduce and potentially block fluid flow between the source 130 and the drain 140. As described above, either of the gates 110A, 110B or both of the gates can be applied with high pressure and move into a high pressure state to make the corresponding deformable chambers 111A, 111B expand towards the channel 120.

The rigid elements 150A, 150B are the "additional elements" included in the fluidic device 102 as part of the co-casting process. In some embodiments, the position of the rigid elements 150A, 150B inside the fluidic device 102 is fixed relative to the fluidic device 102 itself, such that there is minimal movement of the gates 110A, 110B with changes in fluid pressure in the gates. The rigid materials 150A, 150B are made out of a material that has a high resistance to stretch such that it at least has a higher resistance to stretch than the base materials (e.g., underlying substrate) of the fluidic device 102. For example, a stiffness of the rigid materials is at least 10 times as stiff as the base materials. As described above, a rigid material may be, e.g., a stiff fabric, a plastic, a stiff elastomer, a glass, a rigid material with a ratio of stiffness of the rigid material over the base material that is 10 to 100 times that of the base material, or some combination thereof.

The rigid elements 150A, 150B focus deformation of the deformable chambers 111A, 111B toward the channel 120 with increasing fluid pressure at the gates 110A, 110B. For example, if fluid pressure within gates 110A and 110B are in a high pressure range, the deformable chambers 111A and 111B are going to expand. By including the rigid elements 150A and 150B, the expansion of the deformable chambers 111A and 111B is primarily toward the channel 120. If the rigid elements 150A, 150B were not present, a large percentage of the expansion would be in a direction away from the channel 120—and in one embodiment, a much larger fluid volume would be used to generate enough expansion towards the channel 120 to put the channel 120 in a closed state.

The rigid elements 150A-B can have shapes or compositions. As one example, as shown in FIGS. 1A-1B, each of the multiple rigid elements 150A-B is a ring-shaped element surrounding the channel 120 and placed relatively outside and adjacent to the outer surface 112A, 112B of the gates 110A, 110B. In particular, one rigid element 150A is placed closer to the source 130 and the other rigid element 150B is placed closer to the drain 140. Additionally, in terms of the position of the rigid elements 150A and 150B relative to the gate 110A and the gate 110B, respectively, the distance between the outer surface (112A and/or 112B) and the rigid element (150A and/or 150B) may vary in different embodiments to achieve different effects of control of the deformation of components (e.g., gate and channel 120) of the fluidic device 100. For example, the distance may be shorter to allow relatively easier control of deformation of the channel 120 compared with a longer distance between the rigid element 150 and the gate in another embodiment.

As another example not shown, rigid elements may be placed inside the fluidic device 102 to surround the part of the gate 110A, 110B that are closer to the fluid entrance of the gate. As yet another example, the fluidic device 102 may have multiple separate rigid elements that are placed close to the outer surface 112A, 112B of the gates 110A, 110B, for example, multiple separate cubes.

FIG. 1B is a second cross section 160 orthogonal to the first cross section 100 of the symmetric co-casted fluidic device 102 shown in FIG. 1A, in accordance with an embodiment. The cross section 160 shown in FIG. 1B is a view from the drain 140 of the fluidic device 100, and the rigid element seen from this view is the rigid element 150B illustrated in FIG. 1A that is placed closer to the drain 140. Note this view is simplified such that portions of the fluidic device 102 are transparent for ease of illustration, and in practice some or all of the fluidic device 102 may be opaque. In some embodiments, a tapered geometry is used such that there is a large surface area exposed to the "gate" tapering to a tiny area at the channel wall. This configuration would have a "force concentrating" effect: the gate pressure multiplied by area of the wide part of the rigid element 150 is approximately equal to an area of narrow part multiplied by pressure on channel 120. The cross section 160 of the fluidic device 102 includes the gates 110A, 110B with corresponding deformable chambers 111A, 111B, outer surfaces 112A, 112B and inner surfaces 114A, 114B, the channel 120, and the ring-shaped rigid element 150B. As shown in FIG. 1B, the channel 120 is circular and the channel walls 122A and 122B form the complete channel wall of the whole channel. As described above, the rigid element 150B is placed at a certain distance relatively outside and adjacent to the gate 110 and is surrounding the channel 120. With high fluid pressure applied to one or more gates (e.g., to only gate 110A, or to only gate 110B, or to both gates 110A, 110B), the corresponding deformable chamber(s) expand. The rigid element (150A or 150B) mitigates expansion away from the channel 120, thereby focusing the expansion towards the channel 120. Accordingly, a much lower fluid volume is required to put the channel in a "closed" state compared with no rigid element being included in the fluidic device 100. In alternative embodiments not shown, the cross section of the fluidic device 102 and or one or more of the components (e.g., channel 120, gates 110A, 110B, etc.) within the fluidic device 102 may be rectangular, or some other shape.

FIG. 2A is a first cross section 200 of an example symmetric co-casted fluidic device 202 including force concentrators 250A, 250B, in accordance with an embodiment. Similar to the fluidic device 102 shown in FIG. 1A, the fluidic device 202 in FIG. 2A includes a gate 210A, a gate 210B, a channel 220 that connects a source 230 and a drain 240. The channel 220 also includes a channel wall 222A and a channel wall 222B. Different from the fluidic device 102 shown in FIG. 1A, the fluidic device 202 further includes a pair of force concentrators 250A, 250B. The fluidic device 202 shown in FIG. 2A is merely one example, and in alternative embodiments not shown, the fluidic device 202 may include additional/fewer or different fluidic components.

Similar to FIG. 1A, the gates 210A, 210B in FIG. 2A include corresponding deformable chambers 211A, 211B. Taking gate 210A as an example, as discussed in detail below, once fluid pressure increases within the deformable chamber 211A past a threshold pressure, the inner surface 214A of the gate 210A deforms towards the channel 220, causing the channel wall 222A to move towards the opposite channel wall 222B. For example, if the fluid pressure is within a low pressure range, then minimal deformation of the inner surface 214A toward the channel 220 occurs. As fluid pressure in the gate 210A increases and it moves into a transitionary range, and the inner surface 214A expands causing the channel wall 222A to move towards the channel wall 222B, and therefore reduces a size of the cross section of the channel 220 (i.e., reduces flow rate within the channel 220).

The force concentrators 250A, 250B are the "additional elements" included in the fluidic device 202 as part of the co-casting process, which allows easier and better control of deformation of the fluidic device. More specifically, each of the pair of force concentrators 250A, 250B is a wedge-shaped element that is placed between the gate 210 and the channel 220, and further includes a force reception surface (252A and 252B) and a force concentration surface (254A and 254B). In particular, the force concentrator 250A includes the force reception surface 252A that is close to the inner surface 214A of the gate 210A, and the force concentration surface 254A that is close to the channel wall 222A. The force concentrator 250B includes the force reception surface 252B that is close to inner surface 214B of the gate 210B, and the force concentration surface 254B that is close to the channel wall 222B. In some embodiments, the force concentrators 250A, 250B are capable of moving inside the fluidic device 202 when undergoing force or pressure from a deformable chamber associated with a gate. For example, when undergoing force from the gate 210A via the deformable chamber 211A, the force concentrator 250A moves toward the channel wall 222A. In particular, for each of the force concentrators 250, for example, the force concentrator 250A, the force reception surface 252A receives the force from the inner surface 214A of the gate 210A when the deformable chamber 211A expands towards the force concentrator 250A, and the force concentration surface 254A concentrates the force received by the force reception surface 252A and "transfer" the force to the channel wall 222A. As shown in FIG. 2A, for each of the force concentrators 250A, 250B, the area of the force concentration surface 254 is smaller than the area of the force reception surface 252, which allows higher pressure sustained by the force concentration surface 254 compared with a lower pressure sustained by the force reception surface 252 with the same amount of force, in which case the force applied to the force concentrator 250A, 250B is "concentrated on" the force concentration surface to better control the deformation of the channel 220. The force concentrators 250A, 250B are made of materials like stiffening materials that deform less easily than the base materials of the fluidic device 202. Example force concentrator materials include plastic, wax, a stiff elastomer, or some combination thereof.

The design of the difference between areas of the force reception surface 252 and force concentration surface 254 of each force concentrator 250 allows easier control of deformation of components of the fluidic device 202 (e.g., the gate 210 and the channel 120). As one example, with an increasing fluid pressure inside the gate 210A, to the deformable chamber 211A expands to further press the force concentrator 250A, particularly the force reception surface 252A, the force concentrator 250A is forced to move correspondingly towards the channel wall 222A to press the channel 220. The force concentration surface 254A with the smaller area compared with the force reception surface 252A with the larger area enables the channel wall 222A to be pressed towards the channel wall 222B and the channel 220 to be squeezed with a smaller amount of force, which further enables easier control of the deformation of the channel.

The force concentrators 250A, 250B in FIG. 2A are merely one example, and in alternative embodiments not shown, the fluidic device 202 may have a different number of force concentrators with the same or different shapes, and the positions of the force concentrators placed inside the fluidic device may vary. Additionally, in FIG. 2A, for a single force concentrator 250A or 250B, the ratio of area of the force reception surface 252A, 252B and of the force concentration surface 254A, 254B may vary in different embodiments. For example, the ratio may be larger in one embodiment to allow an easier control of deformation of the channel 220 compared with a smaller ratio in another embodiment.

FIG. 2B is a second cross section 260 is orthogonal to the first cross section 200 of the symmetric co-casted fluidic device 202 shown in FIG. 2A, in accordance with an embodiment. The cross section 260 shown in FIG. 2B is a view from the drain 240 of the fluidic device 200. Note this view is simplified such that portions of the fluidic device 202 are transparent for ease of illustration, and in practice some or all of the fluidic device 202 may be opaque. The cross section 260 of the fluidic device 202 includes the gates 210A, 210B with the inner surface 214, the channel 220 including the channel walls 222A and 222B, and the pair of force concentrators 250 with force reception surface 252 and force concentration surface 254. As shown in FIG. 2B, the channel 220 is circular and the channel walls 222A and 222B form the complete channel wall of the whole channel. As described above, each force concentrator 250A, 250B is placed at a certain position between the gates 210A, 210B and the channel 220. With an increasing fluid pressure inside the gate 210A past a threshold pressure, the corresponding deformable chamber 211A expands to press the force reception surface 252A of the force concentrator 250A, and the force concentrator then moves towards the channel 220. In particular, the force concentration surface 254A concentrates and transfers the force received by the force reception surface 252A to the channel wall 222A, allowing the channel 220 to deform (e.g., to reach a "closed" state) with a much smaller force than it would otherwise, which further allows an easier control of the deformation of the channel. In alternative embodiments not shown, the cross section of the fluidic device 202 and/or one or more of the components (e.g., channel 220, gates 210A, 210B, force concentrators 250A, 250B, etc.) within the fluidic device 202 may be rectangular, or some other shape, e.g., a lemon-shaped channel.

Turning now to asymmetric fluidic devices, FIG. 3A is a first cross section 300 of an example asymmetric co-casted fluidic device 302 including a force concentrator 351, in accordance with an embodiment. More specifically, the fluidic device 302 in FIG. 3A includes a gate 310 including an inner surface 314, a channel 320 that connects a source 330 and a drain 340. Different from the fluidic devices shown in FIGS. 1A-2B, the asymmetrical fluidic device 302 includes a single gate 310 instead of two symmetrical gates placed outside the channel 320. The fluidic device 302 further includes a rigid element 350 and a force concentrator 351, each of which is placed to semi-surround the channel 320 and opposite to each other. The fluidic device 302 shown in FIG. 3A is merely one example, and in alternative embodiments not shown, the fluidic device 302 may include additional/fewer or different fluidic components.

Different from embodiments shown in FIGS. 1A-2B, there is one gate 310 in the asymmetrical fluidic device 302 in FIGS. 3A-3B. The gate 310 includes a deformable chamber 311. The deformable chamber 311 deforms with changes in fluid pressure applied at the gate 310. The deformable chamber 311 includes an inner surface 314. In this embodiment the inner 311 refers to surface of the gate 311 that is parallel to and close to channel wall 322B of the channel 320.

Similar to the embodiments shown in FIGS. 1A-2B, the gate 310 is filled with a fluid (e.g., liquid or gas) that comes from an external fluid supply that is not shown (e.g., another fluidic device, a fluid pressure rail, some other fluid supply, etc.). In alternative embodiments not shown, the deformable chamber 311 can have different shapes and configurations or is positioned in a different place inside the fluidic device 300. As one example, as discussed in detail below, once fluid pressure increases within the deformable chamber 311 past a threshold pressure, the inner surface 314 deforms towards the channel 320, causing the channel wall 322B to move towards the opposite channel wall 322A. As fluid pressure in the gate 310 increases and it moves into a transitionary range, and the inner surface 314 expands causing the channel wall 322B to move towards the channel wall 322A, and therefore reduces a size of the cross section of the channel 320 (i.e., reduces flow rate within the channel 320).

The rigid element 350 and the force concentrator 351 are the "additional elements" included in the asymmetrical fluidic device 302 that are part of the co-casting process, which allows easier and better control of deformation of the fluidic device 300. In some embodiments, the rigid element 350 may have the same shape and is composed of the same material with the rigid element 150 shown in FIG. 1A-B, and the force concentrator 351 may have the same shape and is composed of the same material with the force concentrator 250 shown in FIG. 2A-B.

As shown in FIG. 3A, the force concentrator 351 is a wedge-shaped element that is placed between the gate 310 and the channel wall 322B and opposite to the rigid element 350. The force concentrator 351 further includes a force reception surface 352 that is close to inner surface 314 of the gate 310 and a force concentration surface 354 that is close to the channel wall 322B. Similar to the force concentrators 250A, 250B shown in FIGS. 2A-2B, the force concentrator 351 is capable of moving inside the fluidic device 302 when undergoing force or pressure from outside. For example, when undergoing force from the gate 310, the force concentrator 351 may move toward the channel 320. The area of the inner surface 354 is smaller than the area of the outer surface 352, which allows higher pressure retained by the inner surface 354 compared with a lower pressure retained by the outer surface 352 with the same amount of force, in which case the force applied to the force concentrator 351 is "concentrated on" the inner surface to better control the deformation of the channel 320 that is placed close to the inner surface of the force concentrator.

The rigid element 350 is an element placed outside the channel 320 and opposite to the force concentrator 351 and the gate 310. In some embodiments, the position of the rigid element 350 in the fluidic device 302 is fixed and the rigid elements generally do not move when undergoing pressure from the channel 320 (e.g., when the channel 320 is in a closed state).

Similar to the fluidic devices illustrated in FIGS. 1A-2B, the rigid element 350 and the force concentrator 351 allows easier control of deformation of components (e.g., the gate 310 and the channel 320) inside the fluidic device 300. For example, increasing pressure of the fluid inside the gate 310 may cause the gate 310 to expand to further press the force concentrator 351. The force concentrator 351 would then correspondingly apply a force towards the channel 320. In this case the inner surface 354 with a smaller area compared with the outer surface 352 enables the channel 320 to be squeezed with a smaller amount of force, which further enables easier control of the deformation of the channel.

In alternative embodiments not shown, for the force concentrator 351, the ratio of area of the outer surface 352 and of the inner surface 354 may vary in different embodiments. For example, the ratio may be larger in one embodiment to allow an easier control of deformation of the channel 320 compared with a smaller ratio in another embodiment. Additionally, the position of the rigid element 350 inside the fluidic device 302 may vary in different embodiments.

FIG. 3B is a second cross section 360 orthogonal to the first cross section of the fluidic device 302 shown in FIG. 3A, in accordance with an embodiment. The cross section 360 shown in FIG. 3B is a view from the drain 340 of the fluidic device 300. Note this view is simplified such that portions of the fluidic device 302 are transparent for ease of illustration, and in practice some or all of the fluidic device 302 may be opaque. The cross section 360 of the fluidic device 302 includes the gate 310 with the corresponding deformable channel 311 and inner surface 314, the channel 320, the rigid element 350 and the force concentrator 351. As shown in FIG. 3B, the channel 320 is circular and the channel walls 322A and 322B form the complete channel wall of the whole channel. As described above, the force concentrator 351 is placed at a certain position between the gate 310 and the channel 320, and the rigid element 350 is placed adjacent to the channel but opposite to the gate. With an increasing fluid pressure inside the gate 310 past a threshold pressure, the corresponding deformable chamber 311 expands to press the force reception surface 352 of the force concentrator 351, and the force concentrator then moves towards the channel 320. In particular, the force concentration surface 354 concentrates and transfers the force received by the force reception surface 352 to the channel wall 322B, allowing the channel 320 to deform (e.g., to reach a "closed" state) with a much smaller force than it would otherwise. In addition, the rigid element 350 also helps restricts the channel 320 from further expansion when the channel receives pressure from the force concentrator 352, which further allows an easier control of the deformation of the channel. In alternative embodiments not shown, the cross section of the fluidic device 302 and/or one or more of the components (e.g., channel 320, gate 310, force concentrator 351, etc.) within the fluidic device 202 may be rectangular, or some other shape, e.g., a lemon-shaped channel.

FIG. 4A is a first cross section 400 of an example asymmetric fluidic device 402 including a jagged channel 420, in accordance with an embodiment. The fluidic device 402 in FIG. 4A includes a gate 410A, a gate 410B, the jagged channel 420 that connects a source 430 and a drain 440, and multiple rigid elements 450A-C. In particular, the gate 410A and the gate 410B are asymmetrical and are placed outside the jagged channel 420 and opposite to each other. The jagged channel 420 further includes multiple protruding elements 455A-C, as more fully described below. The fluidic device 402 shown in FIG. 4A is merely one example, and in alternative embodiments not shown, the fluidic device 402 may include additional/fewer or different fluidic components.

The jagged channel 420 is a part of the fluidic device 402 that is filled with fluid (e.g., liquid or gas) flowing from the source 430 to the drain 440 while the channel is in an "open" state. The pressure of the fluid at the source 430 is typically higher than the pressure of the fluid at the drain 440, which allows the fluid to flow from the source to the drain. Different from the fluidic devices shown in FIGS. 1A-3B, the jagged channel 420 of the fluidic device 402 is shaped by the protruding elements 455A-C, which allows a more complete "closed" state when the gates (gate 410A, gate 410B or both gates 410A and 410B) press the jagged channel 420. In FIG. 4B, the shape of the cross section of the jagged channel 420 is a rectangular, as more clearly shown in FIG. 4B. In alternative embodiments not shown, the channel 420 does not have to be a jagged channel, and can have other shapes, e.g., a lemon-shaped channel as discussed below with regard to FIG. 7B.

The gates 410A, 410B are asymmetric relative to the jagged channel 420. The gates 410A, 410B include deformable chambers 411A, 411B, respectively. The deformable chambers 411A, 411B deform with changes in fluid pressure applied at the gates 410A, 410B. The deformable chamber 411A includes an outer surface 412A and an inner surface 414A, likewise, the deformable chamber 411B includes an outer surface 412B and an inner surface 414B. In this embodiment the inner surfaces 414A, 414B of the deformable chambers 411A, 411B refer to surfaces of the gates 410A, 410B that are parallel to and close to channel walls 422A, 422B of the jagged channel 420. The outer surfaces 412A, 412B described herein refer to surfaces of the gates 410A, 410B that are parallel with the jagged channel 420 but closer to the rigid elements 450A, 450B and 450C.

The gates 410A, 410B are filled with a fluid (e.g., liquid or gas) that comes from an external fluid supply that is not shown (e.g., another fluidic device, a fluid pressure rail, some other fluid supply, etc.). As one example, as discussed in detail below, once fluid pressure increases within the deformable chamber 411A past a threshold pressure, the inner surface 414A deforms towards the channel 420, causing the channel wall 422A to move towards the opposite channel wall 422B. For example, if the fluid pressure is within a certain pressure range, then minimal deformation of the inner surface 414A toward the jagged channel 420 occurs. As fluid pressure in the gate 410A increases and it moves into a transitionary range, and the inner surface 414A expands causing the channel wall 422A to move towards the channel wall 422B, and therefore reduces a size of the cross section of the jagged channel 420 (i.e., reduces flow rate within the jagged channel 420). The gate 410B is functionally similar to the gate 410A. Once the fluid pressure in the gate 410A and the gate 410B move into a high pressure range, the expansion of the inner surfaces 414A and 414B are such that the channel walls 422A and 422B have restricted the flow to a flow rate that puts the fluidic device 402 in a "closed" state. In some embodiments, the "closed" state may be zero flow (i.e., channel walls 422A and 422B are in contact and preventing flow from the source 430 to the drain 440). In this manner, fluid pressure applied to the gates 410A, 410B can reduce and potentially block fluid flow between the source 430 and the drain 440. As described above, either of the gates 410A, 410B or both of the gates can be applied with high pressure and move into a high pressure state to make the corresponding deformable chambers 411A, 411B expand towards the jagged channel 420.

The rigid elements 450A-C are the "additional elements" included in the fluidic device 202 402 as part of the co-casting process, which allows easier and better control of deformation of the fluidic device. More specifically, the rigid elements 450A, 450B are placed relatively outside and adjacent to the outer surface 412A of the gate 410A, and the rigid element 450C is placed relatively outside and adjacent to the outer surface 412B of the gate 410B. In some embodiments, the rigid elements 450 have the same features (e.g., position, material type) with the rigid elements 150A, 150B shown in FIGS. 1A-B and the rigid element 350 shown in FIGS. 3A-3B. For example, the positions of the rigid elements 450A-C in the fluidic device 402 are fixed and the rigid elements undergo minimal move when undergoing pressure from outside. The rigid elements 450A-C are made of stiffening materials that are more rigid than the base materials of the fluidic device 400.

As one example, when the increasing pressure of the fluid inside the gate(s) 410 (e.g., only gate 410A, or only gate 410B, or both gates 410A, 410B) causes the corresponding deformable chamber(s) (e.g., only deformable chamber 411A, or only deformable chamber 411B, or both deformable chambers 411A-B) to expand, the corresponding rigid elements (e.g., only rigid elements 450A, 450B, or only rigid element 450C, or all rigid elements 450A-C) prevent the outer expansion of the gate(s) when the outer surface (e.g., only outer surface 412A, or only outer surface 412B, or both outer surfaces 412A-B) touches the rigid element(s). In this case the deformation of the outer part of the deformable chamber(s) 411 decreases while the deformation of the inner part of the deformable chamber(s) increases, and the deformable chamber(s) expand more easily towards the jagged channel 420 with the inner surface(s) 414 pressing the channel to cause the channel to be squeezed. In addition, with the design of the protruding elements 455A-C and the corresponding shape of the jagged channel 420 shown in FIG. 4A, the effective distance for the jagged channel 420 to be closed is reduced from the distance between channel wall 422A and 422B to the distance between the protruding element 455C to the protruding elements 455A and 455B, which makes it easier for the channel to reach a fully "closed" state when the channel is being squeezed by the gate 410. In more detail, for example, while the channel wall 422A moves towards the channel wall 422B, the protruding elements 455A-C are geared up with each other to make the jagged channel 420 fully closed.

As described above, the fluidic device 402 shown in FIG. 4A has three separate rigid elements 450 with each of them being placed close to the corresponding gate 410. In alternative embodiments not shown, the fluidic device 402 may have a different number of rigid elements 450 and the positions of the rigid elements 450 placed relative to the gate 410 inside the fluidic device may vary.

FIG. 4B is a second cross section 460 orthogonal to the first cross section of the fluidic device 402 shown in FIG. 4A, in accordance with an embodiment. The cross section 460 shown in FIG. 4B is a view from a central axis 490 of the jagged channel 420 of the fluidic device 400, and the rigid elements seen from this view are the rigid elements 450A and 450C illustrated in FIG. 4A that are placed closer to the drain. Note this view is simplified such that portions of the fluidic device 402 are transparent for ease of illustration, and in practice some or all of the fluidic device 402 may be opaque. The cross section 460 of the fluidic device 402 includes the gate 410A with the corresponding deformable chamber 411A, the outer surface 412A and the inner surface 414A, the gate 410B with the corresponding deformable chamber 411B, the outer surface 412B and the inner surface 414B, the jagged channel 420, and the rigid elements 450A and 450C. As described above, the rigid elements 450A, and 450C are placed at a certain distance outside the gate 410. With a high fluid pressure of the gate(s) (e.g., to only gate 410A, or to only gate 410B, or to both gates 410A, 410B), to cause the corresponding deformable chamber(s) (e.g., only deformable chamber 411A, only deformable chamber 411B, or both deformable chambers 411A-B) to expand, the rigid elements 450A and 450C help make the expansion more towards the jagged channel 420, in which case a much lower fluid volume is required to put the channel in a "closed" state compared with no rigid element being included in the fluidic device 400. With a high pressure of the fluid flow in the jagged channel 420 to cause the channel to expand outwards and towards the gate 410, the rigid elements 450A and 450C restrict corresponding expansion of the gate. In alternative embodiments not shown, the cross section of the fluidic device 402 and or one or more of the components (e.g., jagged channel 420, gate 410A, 410B, etc.) within the fluidic device 402 may be circular, or some other shape, e.g., a lemon-shaped channel.

FIG. 5A is a first cross section 500 of an example asymmetric fluidic device 502 including a pre-stressed element 550, in accordance with an embodiment. More specifically, the fluidic device 502 includes a gate 510A, a gate 510B, a jagged channel 520 that connects a source 530 and a drain 540, and a pre-stressed element 550. In particular, the gates 510A and 510B symmetrical relative to the channel 520. Similar to the fluidic device 402 shown in FIGS. 4A-4B, the fluidic device 502 further includes multiple protruding elements 555A-C that shapes the channel 520 into a jagged channel, which makes the channel easer to reach a fully "closed" state when pressed by the gates 510, as more fully described below. The fluidic device 502 shown in FIG. 5A is merely one example, and in alternative embodiments not shown, the fluidic device 502 may include additional/fewer or different fluidic components. In FIG. 5B, the shape of the cross section of the jagged channel 520 is rectangular, as more clearly shown in FIG. 5B.

The gates 510A, 510B are symmetric relative to the jagged channel 520. The gates 510A, 510B include deformable chambers 511A, 511B, respectively. The deformable chambers 511A, 511B deform with changes in fluid pressure applied at the gates 510A, 510B. The deformable chamber 511A includes an inner surface 514A and the deformable chamber 511B includes an inner surface 514B. In this embodiment the inner surfaces 514A, 514B of the deformable chambers 511A, 511B refer to surfaces of the gates 510A, 510B that are parallel to and close to channel walls 522A, 522B of the jagged channel 520.

Similar to the gates shown in FIGS. 1A-4B, the gates 510A, 510B are filled with a fluid (e.g., liquid or gas) that comes from an external fluid supply that is not shown (e.g., another fluidic device, a fluid pressure rail, some other fluid supply, etc.). As one example, as discussed in detail below, once fluid pressure increases within the deformable chamber 511A past a threshold pressure, the inner surface 514A deforms towards the jagged channel 520, causing the channel wall 522A to move towards the opposite channel wall

522B. For example, if the fluid pressure is within a certain pressure range, then minimal deformation of the inner surface 514A toward the jagged channel 520 occurs. As fluid pressure in the gate 510A increases and it moves into a transitionary range, and the inner surface 514A expands causing the channel wall 522A to move towards the channel wall 522B, and therefore reduces a size of the cross section of the jagged channel 520 (i.e., reduces flow rate within the jagged channel 520). The gate 510B is functionally similar to the gate 510A. As described above, either of the gates 510A, 510B or both of the gates can be applied with high pressure and move into a high pressure state to make the corresponding deformable chambers 511A, 511B expand towards the jagged channel 520.

The pre-stressed element 550 is a material that deforms with a lower force than the surrounding substrate. In one embodiment, the pre-stressed element 550 is a pre-stressed spring that is placed across the gate 510B. In another embodiment, the pre-stressed element 550 is a section of the material which is stretched during fabrication to provide an additional force working to close the channel 520. An example pre-stressed element 550 could be produced by pressurizing the gate with a UV curable resin which is hardened in the pressurized state, thereby ensuring the base material remains stretched. The pre-stressed element 550 reduces an amount of force or pressure from the gate 510B that would cause the protrusion 555C to move towards an opposite wall of the jagged channel 520 (e.g., towards the gate 510A).

FIG. 5B is a second cross section 560 orthogonal to the first cross section 500 of the fluidic device 502 shown in FIG. 5A, in accordance with an embodiment. The cross section 560 shown in FIG. 5B is a view from the drain 540 of the fluidic device 500. Note this view is simplified such that portions of the fluidic device 502 are transparent for ease of illustration, and in practice some or all parts of the fluidic device 500 may be opaque. The cross section 560 of the fluidic device 502 includes the gate 510A with the corresponding deformable chamber 511A, the gate 510B with the corresponding deformable chamber 511B, the jagged channel 520, and the pre-stressed element 550. As described above, the protruding elements (not shown) and the pre-stress allows an easier full closure of the channel 520 and an easier control of the deformation of the channel 520.

In alternative embodiments not shown, the cross section of the fluidic device 502 and or one or more of the components (e.g., jagged channel 520, gate 510A, 510B, etc.) within the fluidic device 502 may be circular, or some other shape, e.g., a lemon-shaped channel.

Figure 6B:
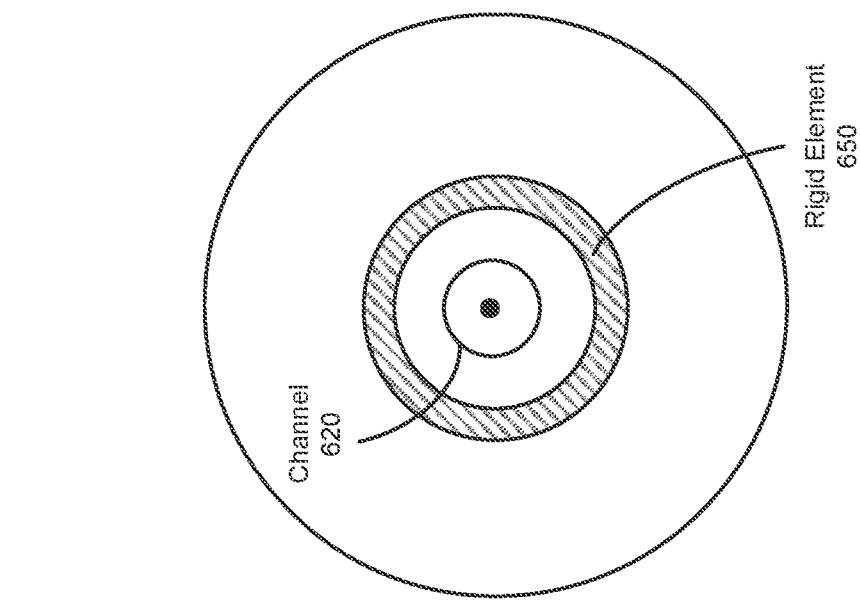
FIG. 6B is a second cross section orthogonal to the first cross section of the fluidic device shown in FIG. 6A, in accordance with an embodiment.
Figure 6A:
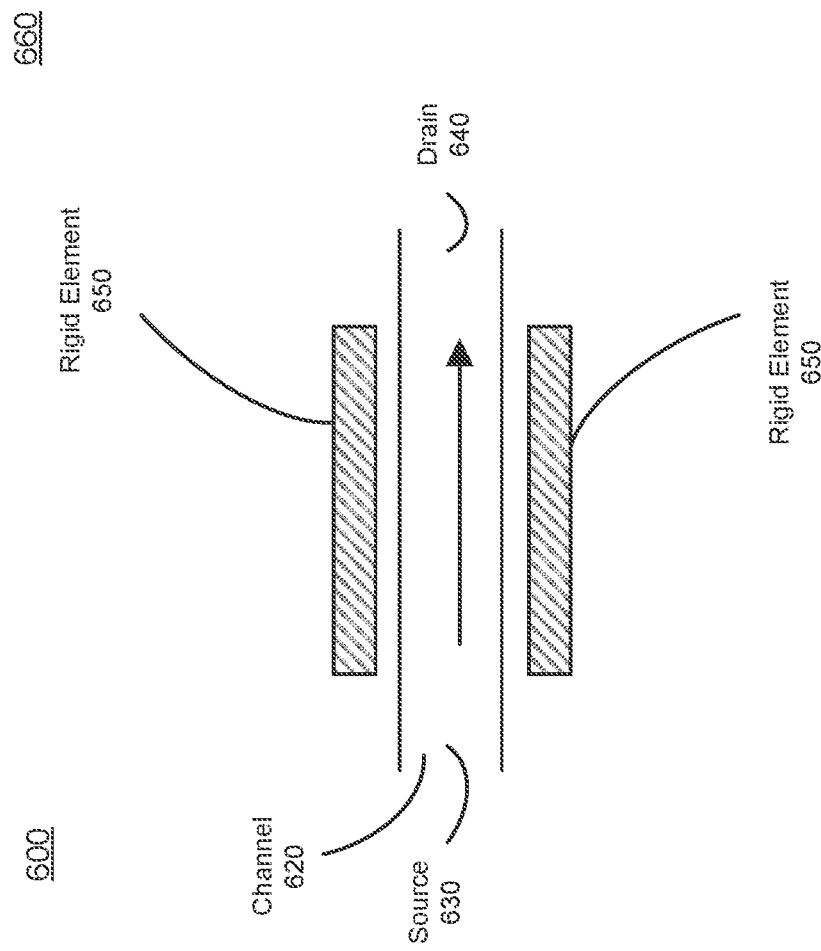
FIG. 6A is a first cross section of an example fluidic device including a reinforced channel, in accordance with an embodiment.

FIG. 6A is a first cross section 600 of an example fluidic device 602 including a reinforced channel 620, in accordance with an embodiment. More specifically, the fluidic device 602 shown in FIG. 6A includes a channel 620 that connects a source 630 and a drain 640, and a rigid element 650. The fluidic device 602 is merely one example, and in alternative embodiments not shown, the fluidic device 602 can have additional and/or different components.

The channel 620 can have different shapes, for example, circular or rectangular. In some embodiments, the rigid element 650 is a ring-shaped element that is surrounding the channel 620. In alternative embodiments not shown, the rigid element 650 can have a different shape, and for example, the rigid element can include multiple separated individual parts positioned outside and adjacent to the channel 620 to control the deformation of the channel. The rigid element 650 is made of stiffening materials that allows easier control of deformation of the channel 620. As one example, as the flow pressure inside the channel 620 increases with the channel correspondingly expands outwards, the rigid element 650 restricts further expansion of the channel when the expansion reaches a certain threshold.

FIG. 6B is a second cross section 660 orthogonal to the first cross section 600 of the fluidic device 602 shown in FIG. 6A, in accordance with an embodiment. The cross section 660 shown in FIG. 6B is a view from the drain 640 of the fluidic device 600, and the cross section includes the channel 620 and the rigid element 650. Note this view is simplified such that portions of the fluidic device 602 are transparent for ease of illustration, and in practice some or all of the fluidic device 602 may be opaque. As described above, the rigid element is placed inside the fluidic device 602 to surround the channel 620 to allow easer control of the deformation of the channel. In alternative embodiments not shown, the cross section of the fluidic device 602 and or one or more of the components (e.g., channel 620, rigid element 650, etc.) within the fluidic device 602 may be rectangular, or some other shape.

FIG. 7A shows deformation of a circular cross section 700 of a channel 720A of an example fluidic device before and after pressure is applied to the channel, in accordance with an embodiment. As shown in FIG. 7A, before pressure is applied to the channel 720, the cross section 700 is in an "open" state with a circular shape that allows fluid inside the channel to flow from one end to the other end (not shown here). After pressure is applied to a portion of the channel 720, the cross section 700 of the channel deforms such that the portion 724 where pressure is applied onto is squeezed while other parts 722 of the channel are not squeezed to completely cut off the fluid flow inside the channel. For example, after the pressure is applied to the portion 724 of the channel 720, the fluid flow inside the channel may still be able to flow from one end to the other end through the parts 722 of the channel that are not squeezed. Note that FIG. 7A is exaggerated somewhat to help illustrate that it can be difficult to prevent fluid flow in a circular chamber without compression distributed across a large portion of the circular channel.

FIG. 7B shows deformation of a lemon-shaped cross section 760 of a channel 740 of an example fluidic device before and after pressure is applied to the channel, in accordance with an embodiment. Different from the embodiment shown in FIG. 7A, the cross section 760 of the channel 740 is lemon-shaped instead of circular. As shown in FIG. 7B, before pressure is applied to the channel 740, the cross section 760 is in an "open" state with a lemon shape that allows fluid inside the channel to flow from one end to the other end (not shown here). Due to the lemon-shaped channel 740, after pressure is applied to a portion 790 of the channel 740, the cross section 760 of the channel 740 deforms such the whole channel is squeezed to completely cut off the fluid flow inside the channel, allowing a full closure of the channel.

Figure 8:
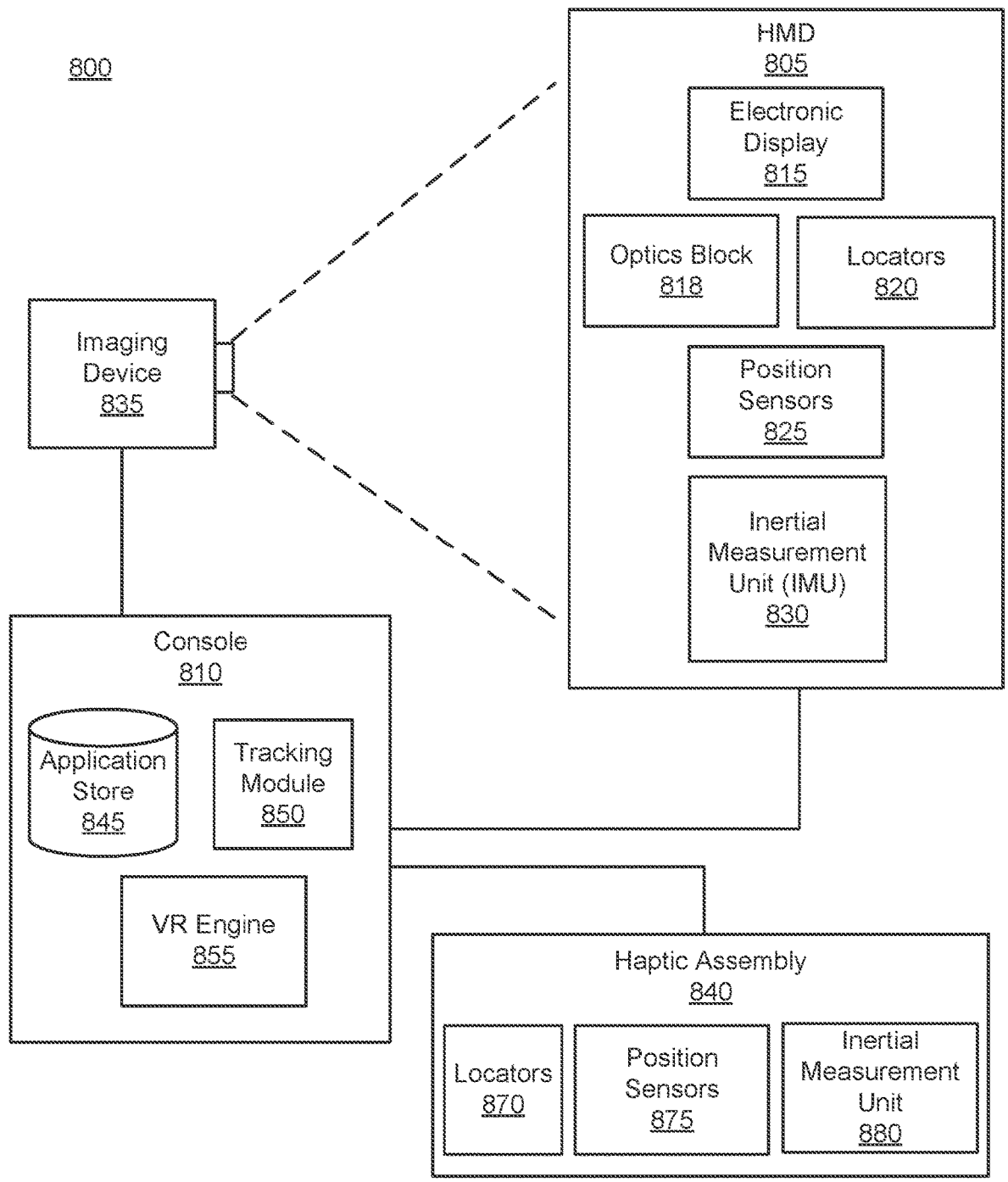
FIG. 8 is a block diagram of a system environment including a VR system, in accordance with an embodiment.

FIG. 8 is a block diagram of a system 800 including a haptic assembly 840, in accordance with one embodiment. The system 800 may operate in a VR environment, an augmented reality (AR) environment, a mixed reality (MR) environment, or some combination thereof. The system 800 comprises a head-mounted display (HMD) 805, an imaging device 835, and the haptic assembly 840 that are each coupled to a console 810. While FIG. 8 shows an example system 800 including one HMD 805, one imaging device 835, and one haptic assembly 840, in other embodiments any number of these components may be included in the system 800. For example, there may be multiple HMDs 805 each having an associated haptic assembly 840 and being monitored by one or more imaging devices 835, with each HMD 805, haptic assembly 840, and imaging device 835 communicating with the console 810. In alternative configurations, different and/or additional components may be included in the system 800. Additionally, in some embodiments the system 800 may be modified to include other system environments, such as an AR system environment.

The HMD 805 presents media to a user. Examples of media presented by the HMD 805 include one or more images, video, audio, or some combination thereof. In some embodiments, audio is presented via an external device (e.g., speakers and/or headphones) that receives audio information from the HMD 805, the console 810, or both, and presents audio data based on the audio information. The HMD 805 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the HMD 805 may also act as an augmented reality (AR) and/or mixed reality (MR) headset. In these embodiments, the HMD 805 augments views of a physical, real-world environment with computer-generated elements (e.g., images, video, sound, etc.).

The HMD 805 includes an electronic display 815, an optics block 818, one or more locators 820, one or more position sensors 825, and an inertial measurement unit (IMU) 830.

The optics block 818 magnifies received light from the electronic display 815, corrects optical errors associated with the image light, and the corrected image light is presented to a user of the HMD 805. An optical element may be an aperture, a Fresnel lens, a convex lens, a concave lens, a filter, or any other suitable optical element that affects the image light emitted from the electronic display 815. Moreover, the optics block 818 may include combinations of different optical elements. In some embodiments, one or more of the optical elements in the optics block 818 may have one or more coatings, such as anti-reflective coatings.

The locators 820 are objects located in specific positions on the HMD 805 relative to one another and relative to a specific reference point on the HMD 805. A locator 820 may be a light emitting diode (LED), a corner cube reflector, a reflective marker, a type of light source that contrasts with an environment in which the HMD 805 operates, or some combination thereof. In embodiments where the locators 820 are active (i.e., an LED or other type of light emitting device), the locators 820 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 820 are located beneath an outer surface of the HMD 805, which is transparent to the wavelengths of light emitted or reflected by the locators 820 or is thin enough to not substantially attenuate the wavelengths of light emitted or reflected by the locators 820. Additionally, in some embodiments, the outer surface or other portions of the HMD 805 are opaque in the visible band of wavelengths of light. Thus, the locators 820 may emit light in the IR band under an outer surface that is transparent in the IR band but opaque in the visible band.

The IMU 830 is an electronic device that generates fast calibration data based on measurement signals received from one or more of the position sensors 825. A position sensor 825 generates one or more measurement signals in response to motion of the HMD 805. Examples of position sensors 825 include: one or more accelerometers, one or more gyroscopes, one or more magnetometers, another suitable type of sensor that detects motion, a type of sensor used for error correction of the IMU 830, or some combination thereof. The position sensors 825 may be located external to the IMU 830, internal to the IMU 830, or some combination thereof.

Based on the one or more measurement signals from one or more position sensors 825, the IMU 830 generates fast calibration data indicating an estimated position of the HMD 805 relative to an initial position of the HMD 805. For example, the position sensors 825 include multiple accelerometers to measure translational motion (forward/back, up/down, left/right) and multiple gyroscopes to measure rotational motion (e.g., pitch, yaw, roll). In some embodiments, the IMU 830 rapidly samples the measurement signals and calculates the estimated position of the HMD 805 from the sampled data. For example, the IMU 830 integrates the measurement signals received from the accelerometers over time to estimate a velocity vector and integrates the velocity vector over time to determine an estimated position of a reference point on the HMD 805. Alternatively, the IMU 830 provides the sampled measurement signals to the HMD 810, which determines the fast calibration data. The reference point is a point that may be used to describe the position of the HMD 805. While the reference point may generally be defined as a point in space; however, in practice the reference point is defined as a point within the HMD 805 (e.g., a center of the IMU 830).

The IMU 830 receives one or more calibration parameters from the console 810. As further discussed below, the one or more calibration parameters are used to maintain tracking of the HMD 805. Based on a received calibration parameter, the IMU 830 may adjust one or more IMU parameters (e.g., sample rate). In some embodiments, certain calibration parameters cause the IMU 830 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 835 generates slow calibration data in accordance with calibration parameters received from the console 810. Slow calibration data includes one or more images showing observed positions of the locators 820 that are detectable by the imaging device 835. The imaging device 835 may include one or more cameras, one or more video cameras, any other device capable of capturing images including one or more of the locators 820, or some combination thereof. Additionally, the imaging device 835 may include one or more filters (e.g., used to increase signal to noise ratio). The imaging device 835 is designed to detect light emitted or reflected from locators 820 in a field of view of the imaging device 835. In embodiments where the locators 820 include passive elements (e.g., a retroreflector), the imaging device 835 may include a light source that illuminates some or all of the locators 820, which retro-reflect the light towards the light source in the imaging device 835. Slow calibration data is communicated from the imaging device 835 to the console 810, and the imaging device 835 receives one or more calibration parameters from the console 810 to adjust one or more imaging parameters (e.g., focal length, focus, frame rate, ISO, sensor temperature, shutter speed, aperture, etc.).

The haptic assembly 840 is a device that allows a user to send action requests to the console 810. An action request is a request to perform a particular action. For example, an action request may be to start or end an application or to perform a particular action within the application. The haptic assembly 840 also provides haptic feedback including a perception of contacting a virtual object. In one embodiment, the haptic assembly 840 includes a plurality of composable fluidic devices that form one or more composite fluidic devices. The composite fluidic devices may be used to, e.g., address actuators included in the haptic assembly 840 according to the haptic feedback signal from the console 810. In one embodiment, as more fully described below in FIG. 9, the haptic assembly 840 is a haptic glove through which the console 810 enables a user to interact with a virtual object.

In FIG. 8, the haptic assembly 840 further includes locators 870, one or more position sensors 875, and an inertial measurement unit (IMU) 880. In some embodiments, the locators 870, one or more position sensors 875, an inertial measurement unit (IMU) 880 are installed to determine a physical position or movement of the haptic assembly 840. In addition, the haptic assembly 840 receives, from the console 810, a haptic feedback signal corresponding to haptic feedback to the user. The haptic assembly 840 provides to the user with the haptic feedback of touching a virtual object in a virtual space, according to the haptic feedback signal. Specifically, the haptic assembly 840 prevents or enables a physical movement of a portion of a user in contact with the virtual object in the virtual space. For example, if a user's finger is in contact with a virtual object (e.g., a virtual wall) in a virtual space, the haptic assembly 840 prevents a physical movement of the user finger to move in a direction through the virtual object in the virtual space. Accordingly, the user can receive a perception of contacting the virtual object.

In one embodiment, the haptic feedback signal indicates a position or a portion of the haptic assembly 840 to be actuated, and an amount of actuation of the position or the portion of the haptic assembly 840 for providing haptic feedback. In this embodiment, the amount of actuation is determined by, e.g., the console 810, according to a virtual position of the haptic assembly 840 corresponding to a physical position of the haptic assembly 840 and a virtual position of a virtual object in a virtual space. The haptic assembly 840 provides tactile perception of a user touching the virtual object according to the amount of actuation indicated by the haptic feedback signal.

The locators 870 are objects located in specific positions on the haptic assembly 840 relative to one another and relative to a specific reference point of the haptic assembly 840 on the haptic assembly 840. A locator 870 is substantially similar to a locator 820 except that the locator 870 is part of the haptic assembly 840. Additionally, in some embodiments, the outer surface or other portions of the haptic assembly 840 are opaque in the visible band of wavelengths of light. Thus, the locators 870 may emit light in the IR band under an outer surface that is transparent in the IR band but opaque in the visible band.

A position sensor 875 generates one or more measurement signals in response to motion of the haptic assembly 840. The position sensors 875 are substantially similar to the positions sensors 825, except that the position sensors 875 are part of the haptic assembly 840. The position sensors 875 may be located external to the IMU 880, internal to the IMU 880, or some combination thereof.

Based on the one or more measurement signals from one or more position sensors 875, the IMU 880 generates fast calibration data of the haptic assembly 840 indicating an estimated position of the haptic assembly 840 relative to an initial position of the haptic assembly 840. For example, the position sensors 875 include multiple accelerometers to measure translational motion (forward/back, up/down, left/right) and multiple gyroscopes to measure rotational motion (e.g., pitch, yaw, roll) of the haptic assembly 840. In some embodiments, the IMU 880 rapidly samples the measurement signals and calculates the estimated position of the haptic assembly 840 from the sampled data. For example, the IMU 880 integrates the measurement signals received from the accelerometers over time to estimate a velocity vector and integrates the velocity vector over time to determine an estimated position of a reference point of the haptic assembly 840. Alternatively, the IMU 880 provides the sampled measurement signals to the console 810, which determines the fast calibration data of the haptic assembly 840. The reference point of the haptic assembly 840 is a point that may be used to describe the position of the haptic assembly 840. While the reference point of the haptic assembly 840 may generally be defined as a point in space; however, in practice the reference point of the haptic assembly 840 is defined as a point within the haptic assembly 840 (e.g., a center of the IMU 880).

The IMU 880 receives one or more calibration parameters of the haptic assembly 840 from the console 810. As further discussed below, the one or more calibration parameters of the haptic assembly 840 are used to maintain tracking of the haptic assembly 840. Based on a received calibration parameter of the haptic assembly 840, the IMU 880 may adjust one or more IMU parameters (e.g., sample rate). In some embodiments, certain calibration parameters of the haptic assembly 840 cause the IMU 880 to update an initial position of the reference point of the haptic assembly 840 so it corresponds to a next calibrated position of the reference point of the haptic assembly 840. Updating the initial position of the reference point of the haptic assembly 840 as the next calibrated position of the reference point of the haptic assembly 840 helps reduce accumulated error associated with the determined estimated position.

The console 810 provides media to the HMD 805 for presentation to the user in accordance with information received from one or more of: the imaging device 835, the VR headset 805, and the haptic assembly 840. In the example shown in FIG. 8, the console 810 includes an application store 845, a tracking module 850, and a virtual reality (VR) engine 855. Some embodiments of the console 810 have different modules than those described in conjunction with FIG. 8. Similarly, the functions further described below may be distributed among components of the console 810 in a different manner than is described here.

The application store 845 stores one or more applications for execution by the console 810. An application is a group of instructions, that when executed by a processor, generates content for presentation to the user. Content generated by an application may be in response to inputs received from the user via movement of the HMD 805 or the haptic assembly 840. Examples of applications include: gaming applications, conferencing applications, video playback application, or other suitable applications.

The tracking module 850 calibrates the VR system 800 using one or more calibration parameters and may adjust one or more calibration parameters to reduce error in determination of the position of the HMD 805. For example, the tracking module 850 adjusts the focus of the imaging device 835 to obtain a more accurate position for observed locators on the HMD 805. Moreover, calibration performed by the tracking module 850 also accounts for information received from the IMU 830. Additionally, if tracking of the HMD 805 is lost (e.g., the imaging device 835 loses line of sight of at least a threshold number of the locators 820), the tracking module 850 re-calibrates some or all of the system 800.

The tracking module 850 tracks movements of the HMD 805 using slow calibration information from the imaging device 835. The tracking module 850 determines positions of a reference point of the HMD 805 using observed locators from the slow calibration information and a model of the HMD 805. The tracking module 850 also determines positions of a reference point of the HMD 805 using position information from the fast calibration information. Additionally, in some embodiments, the tracking module 850 may use portions of the fast calibration information, the slow calibration information, or some combination thereof, to predict a future location of the HMD 805. The tracking module 850 provides the estimated or predicted future position of the HMD 805 to the VR engine 855.

The VR engine 855 executes applications within the system 800 and receives position information, acceleration information, velocity information, predicted future positions, or some combination thereof of the HMD 805 from the tracking module 850. Based on the received information, the VR engine 855 determines content to provide to the HMD 805 for presentation to the user. For example, if the received information indicates that the user has looked to the left, the VR engine 855 generates content for the HMD 805 that mirrors the user's movement in a virtual environment. Additionally, the VR engine 855 performs an action within an application executing on the console 810 in response to an action request received from the haptic assembly 840 and provides feedback to the user that the action was performed. The provided feedback may be visual or audible feedback via the HMD 805 or haptic feedback via the haptic assembly 840.

Figure 9:
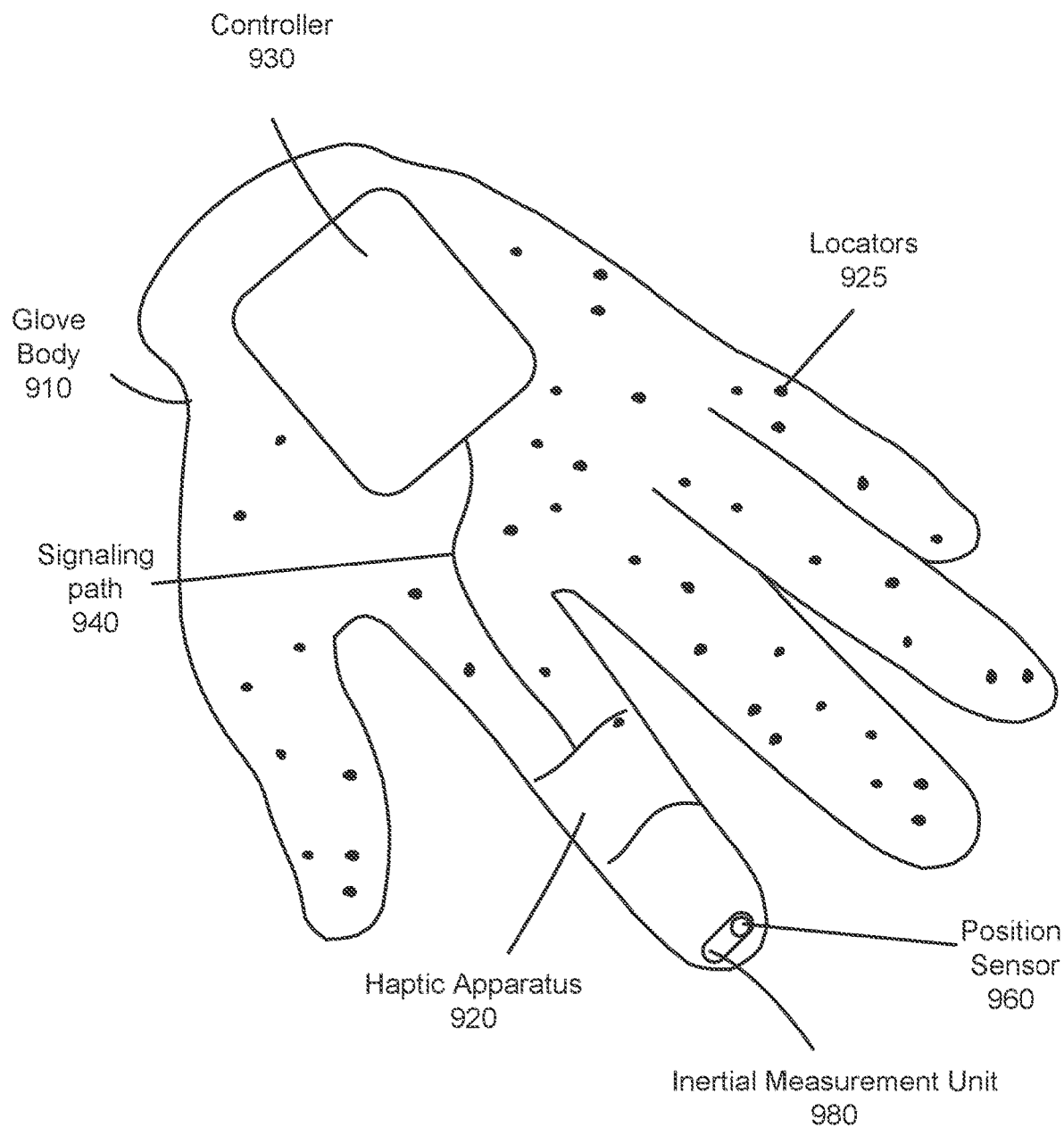
FIG. 9 is an example haptic glove for interacting with virtual objects, in accordance with an embodiment.

FIG. 9 is an example haptic glove 900 for interacting with virtual objects, in accordance with an embodiment. The haptic glove 900 shown in FIG. 9 includes a glove body 910, a haptic apparatus 920, a controller 930, a signaling path 940, one or more locators 925, a position sensor 960 and an IMU 980. Only signaling path 940, one haptic apparatus 920, one position sensor 960 and one IMU 980 are shown in FIG. 9 to simplify the description. In alternative embodiments not shown, the haptic glove 900 can include multiple tubes, position sensors and haptic apparatus that are connected to the controller 930, for example, for each finger of the haptic glove 900, a set of haptic apparatus, position sensors and IMUs may be connected to the controller. Likewise, the functions performed by the various entities of the haptic glove 900 may differ in different embodiments. Additionally, the various entities of the haptic glove 900 may be positioned in different places on the glove body 910. As one example, additional haptic apparatuses 920 and the position sensors 960 are located at different parts of the glove body 910. As another example, the haptic apparatuses 920 are coupled to or wrap the entire fingers of the glove body 910. As another example, the controller 930 is coupled to a different portion of the glove body 910 corresponding to, for example a wrist or a palm.

The glove body 910 is an apparatus covering a hand, for example, a garment that is coupled to the position sensor 960, the haptic apparatus 920, the controller 930, and the signaling 940. In one embodiment, the position sensor 960 is coupled to a corresponding finger of the glove body 910 (e.g., a portion corresponding to a fingertip of the glove body); the haptic apparatus 920 is coupled to a corresponding finger portion (e.g., a portion corresponding to a joint between two phalanges) of the glove body 910; and the controller 930 is coupled to a portion of the glove body 910 corresponding to a back of a hand (i.e., dorsal side). The signaling path 940 is coupled between the controller 930 and the haptic apparatus 920. In one embodiment, one or more of these components are placed beneath an outer surface of the glove body 910, thus are not visible from the outside. Additionally or alternatively, some of these components are placed on an outer surface of the glove body 910, and are visually detectable.

In one embodiment, the haptic glove 900 may be the haptic assembly 840 shown in FIG. 8 and the locators 925, the position sensor 960 and the IMU 980 of the haptic glove 900 may be the corresponding locators 870, position sensors 875 and IMUs 880 of the haptic assembly 840 shown in FIG. 8. A user's hand movement can be detected and tracked according to fast calibration data from the IMU 980 and/or slow calibration of the locators 925 from the imaging device 835. Moreover, haptic feedback including a perception of a user contacting a virtual object can be provided to the user by the controller 930, signaling 940, and haptic apparatus 920.

The haptic apparatus 920 provides haptic feedback including a perception of a user touching a virtual object. In one embodiment, the haptic apparatus 920 is actuated according to instructions received from the controller 930. In one embodiment, the haptic apparatus 920 is coupled to a portion corresponding to a joint between two phalanges of the glove body 910. In another embodiment, the haptic apparatus 920 covers the entire glove body 910 or are placed on other parts (e.g., an area corresponding to a joint between two different fingers) of the glove body 910. The haptic apparatus 920 may be, for example, a plurality of actuators.

The controller 930 is a device that provides instructions for the haptic apparatus 920 to perform specific functions. The controller 930 may receive instructions or haptic feedback from the VR console 810 and actuates the haptic apparatus 920 accordingly. The controller 930 includes a plurality of fluidic devices that generate instructions for one or more haptic apparatuses (e.g., actuators). As discussed in detail above, with regard to FIGS. 1A-7B fluidic devices are composable and may be coupled together to form composite fluidic devices, like, e.g., a decoder. Decoders, for example, can help reduce a number of logical connections within the controller 930 and/or connections to the haptic apparatus 920. Accordingly, the controller 930 may be composed of a plurality of fluidic devices, including various combinations of those described above with regard to FIGS. 1A-7B. Similar to the controllers 930, the signaling path 940 may be a tube or a fluidic device formed from fluidic devices with reference to FIGS. 1A-7B.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A fluidic device, comprising:
   a channel configured to transport a fluid from a source to a drain, wherein the channel comprises
   a first wall and a second wall, wherein the first wall includes at least one protruding element that protrudes into the channel such that a diameter of the channel is decreased; and a gate that includes a chamber with an adjustable volume that is configured to affect fluid flow within the channel by displacing the first wall toward the second wall, the displacing based in part on fluid pressure within the chamber;
   wherein the at least one protruding element is pre-stressed to reduce a threshold pressure required for the chamber to displace the first wall of the channel toward the second wall of the channel; and
   the channel comprises a jagged section between the source and the drain, wherein the at least one protruding element comprises a first protruding element in the first wall and the second wall comprises a second protruding element and a third protruding element, wherein the first protruding element is configured to fit in a space between the second protruding element and third protruding element when the first wall is displaced toward the second wall.

2. The fluidic device of claim 1, wherein the pre-stressed at least one protruding element comprises a material that deforms with a lower force than a surrounding substrate.

3. The fluidic device of claim 1, wherein the pre-stressed at least one protruding element comprises a pre-stressed spring that is positioned across the gate.

4. The fluidic device of claim 1, wherein the pre-stressed at least one protruding element comprises a material that is stretched during fabrication.

5. The fluidic device of claim 4, wherein the material of the pre-stressed at least one protruding element comprises a curable resin.

6. The fluidic device of claim 1, wherein the channel has a non-circular cross section.

7. The fluidic device of claim 6, wherein the channel has a rectangular cross section.

8. The fluidic device of claim 1, further comprising another gate that includes another chamber with an adjustable volume that affects fluid flow within the channel by displacing the second wall toward the first wall, the displacing based in part on fluid pressure within the other chamber.

9. A method of fabricating a fluidic device, comprising:
   forming a channel in a substrate, the channel being configured to transport a fluid from a source to a drain and including a first wall with a protrusion into the channel and a second wall opposing the first wall;
   forming an adjustable chamber within the substrate, the channel being positioned adjacent to the first wall of the channel;
   pre-stressing the protrusion to reduce a threshold pressure within the adjustable chamber required for the adjustable chamber to displace the first wall toward the second wall and
   the channel comprises a jagged section between the source and the drain;
   wherein the protrusion comprises a first protrusion in the first wall and the second wall comprises a second protrusion and a third protrusion;
   wherein the first protrusion is configured to fit in a space between the second protrusion and third protrusion when the first wall is displaced toward the second wall.

10. The method of claim 9, wherein pre-stressing the protrusion comprises stretching the protrusion prior to curing a material forming the protrusion.

11. The method of claim 10, wherein stretching the protrusion comprises pressurizing the adjustable chamber.

12. The method of claim 10, further comprising curing the material forming the protrusion by exposing the material forming the protrusion to ultraviolet light while the protrusion is stretched.

13. The method of claim 9, wherein pre-stressing the protrusion comprises pre-stressing a spring.

14. A wearable device, comprising:
   a controller configured to provide a haptic feedback signal;
   a fluidic device configured to provide haptic feedback to a user in response to receiving the haptic feedback signal from the controller, the fluidic device comprising:

a fluid channel including a first wall and an opposing second wall, wherein the first wall includes a protruding element that protrudes into the channel; and a gate adjacent to the first wall, the gate including a chamber with an adjustable volume configured to force the first wall and the protruding element toward the second wall upon application of a fluid pressure within the chamber;

wherein the protruding element is pre-stressed to reduce a pressure required to displace the first wall toward the second wall; and wherein the second wall of the channel of the fluidic device further comprises two additional protruding elements that protrudes into the channel, the additional protruding elements are shaped and sized to be intermeshed when the first wall is displaced toward the second wall.

15. The wearable device of claim 14, wherein the wearable device comprises a glove and the fluidic device is positioned on the glove.

16. The wearable device of claim 14, wherein the protruding element is pre-stressed to include a material that deforms with a lower force than a surrounding substrate.

17. The fluidic device of claim 14, wherein the fluidic device further comprises another gate adjacent to the second wall, the other gate including another chamber with an adjustable volume configured to force the second wall toward the first wall upon application of a fluid pressure within the other chamber.

* * * * *